United States Patent [19]

Shinohara et al.

[11] Patent Number: 5,204,932
[45] Date of Patent: Apr. 20, 1993

[54] SERVO CIRCUIT FOR MAGNETIC DISK APPARATUS

[75] Inventors: Tohru Shinohara, Kawasaki; Shuichi Hashimoto, Tokyo, both of Japan

[73] Assignee: Fujitsu Limited, Kawasaki, Japan

[21] Appl. No.: 460,651

[22] Filed: Jan. 3, 1990

[30] Foreign Application Priority Data

| Jan. 10, 1989 [JP] | Japan | 1-3189 |
| Jan. 31, 1989 [JP] | Japan | 1-21307 |
| Jan. 31, 1989 [JP] | Japan | 1-21310 |
| Mar. 16, 1989 [JP] | Japan | 1-62149 |

[51] Int. Cl.$^5$ ............................................. G05B 13/00
[52] U.S. Cl. ................................... 388/815; 388/847; 318/594
[58] Field of Search .................. 360/70, 75, 77; 318/560–561, 569, 590, 592, 594, 600, 626, 651; 388/842, 844, 847, 809–815, 910

[56] References Cited

U.S. PATENT DOCUMENTS 3,883,894 5/1975 Johnson ........................ 360/78

FOREIGN PATENT DOCUMENTS 0090379 10/1983 European Pat. Off. .

*Primary Examiner*—William M. Shoop, Jr.
*Assistant Examiner*—David Martin
*Attorney, Agent, or Firm*—Staas & Halsey

[57] ABSTRACT

A servo circuit for a magnetic disk apparatus includes a target speed generating circuit which generates a target speed in accordance with an amount of movement. A speed signal producing circuit produces a real speed from a position signal from a servo object. A speed error generating circuit controls the speed of the servo object based on an error between the target speed and the real speed. Acceleration and deceleration control are performed to position the servo object at the target position. An acceleration detection circuit detects acceleration and outputs an acceleration-in-progress detection signal for changing a cut-off frequency of the speed error generating circuit between acceleration and deceleration. The servo circuit has a servo loop which supplies a seek current based on an error signal between a target speed and real speed to a voice coil motor and performs speed control on a head carriage. An addition circuit adds a predetermined addition value to the error signal during acceleration after the speed control starts. An amplifier determines the frequency characteristics of the servo loop. A gain switching circuit switches a preset gain to a larger gain between the start of a seek operation and the completion of acceleration. A speed signal generating circuit generates the real speed of the servo object based on a position signal of the servo object. A band changing circuit changes the band of a speed signal producing circuit in accordance with a seek difference.

19 Claims, 32 Drawing Sheets

Fig. 8A PRIOR ART Ps
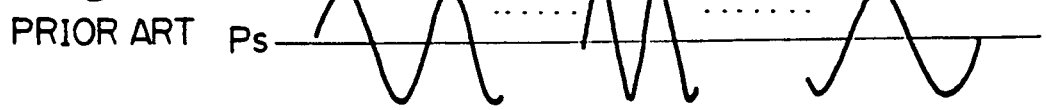
Fig. 8B PRIOR ART Vps
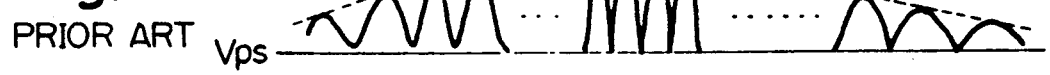
ENVELOPE (Vr)
Fig. 8C PRIOR ART ic
Fig. 8D PRIOR ART Vr
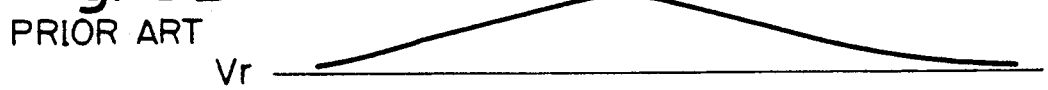
Fig. 8E PRIOR ART Ps
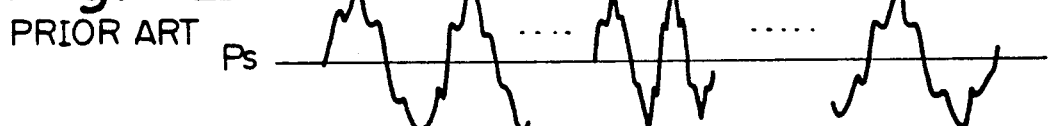
Fig. 8F PRIOR ART Vps
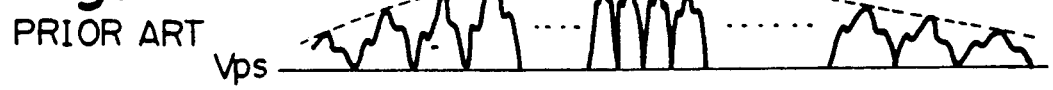
Fig. 8G PRIOR ART Vr
Fig. 8H PRIOR ART Ic

Fig. 9A
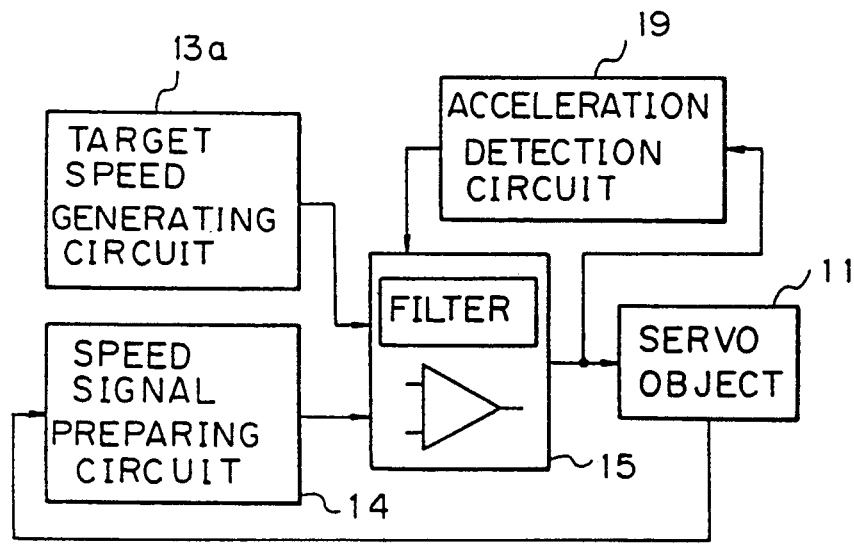
Fig. 9B1
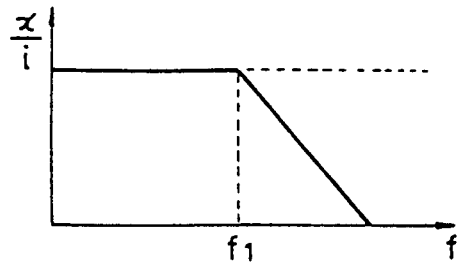
Fig. 9C1
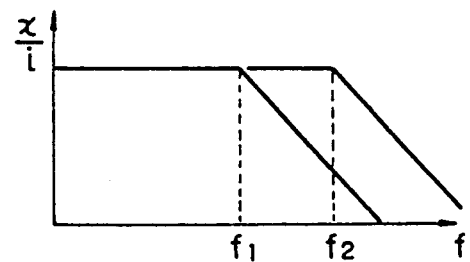
Fig. 9B2
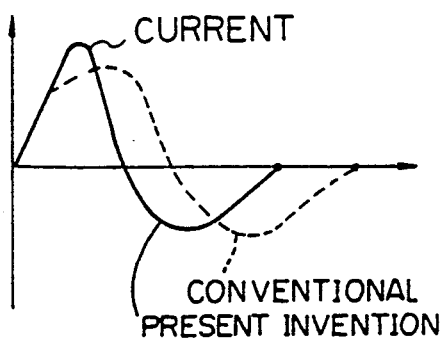
Fig. 9C2
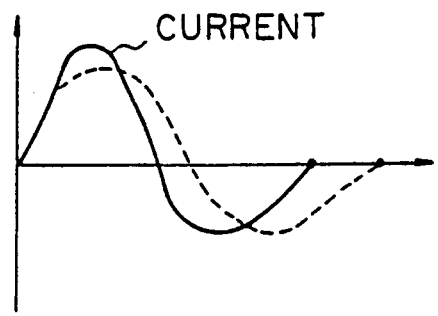

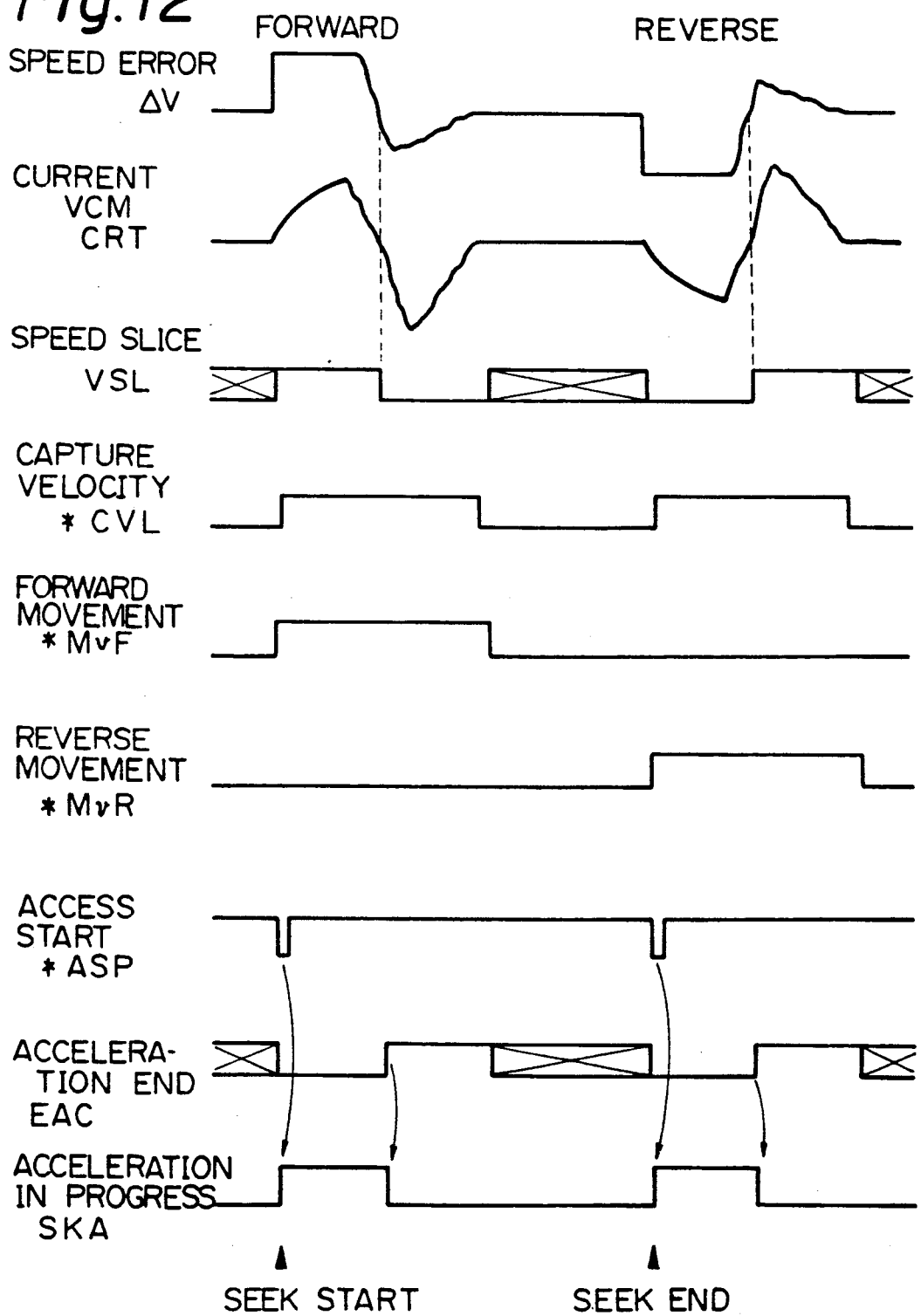

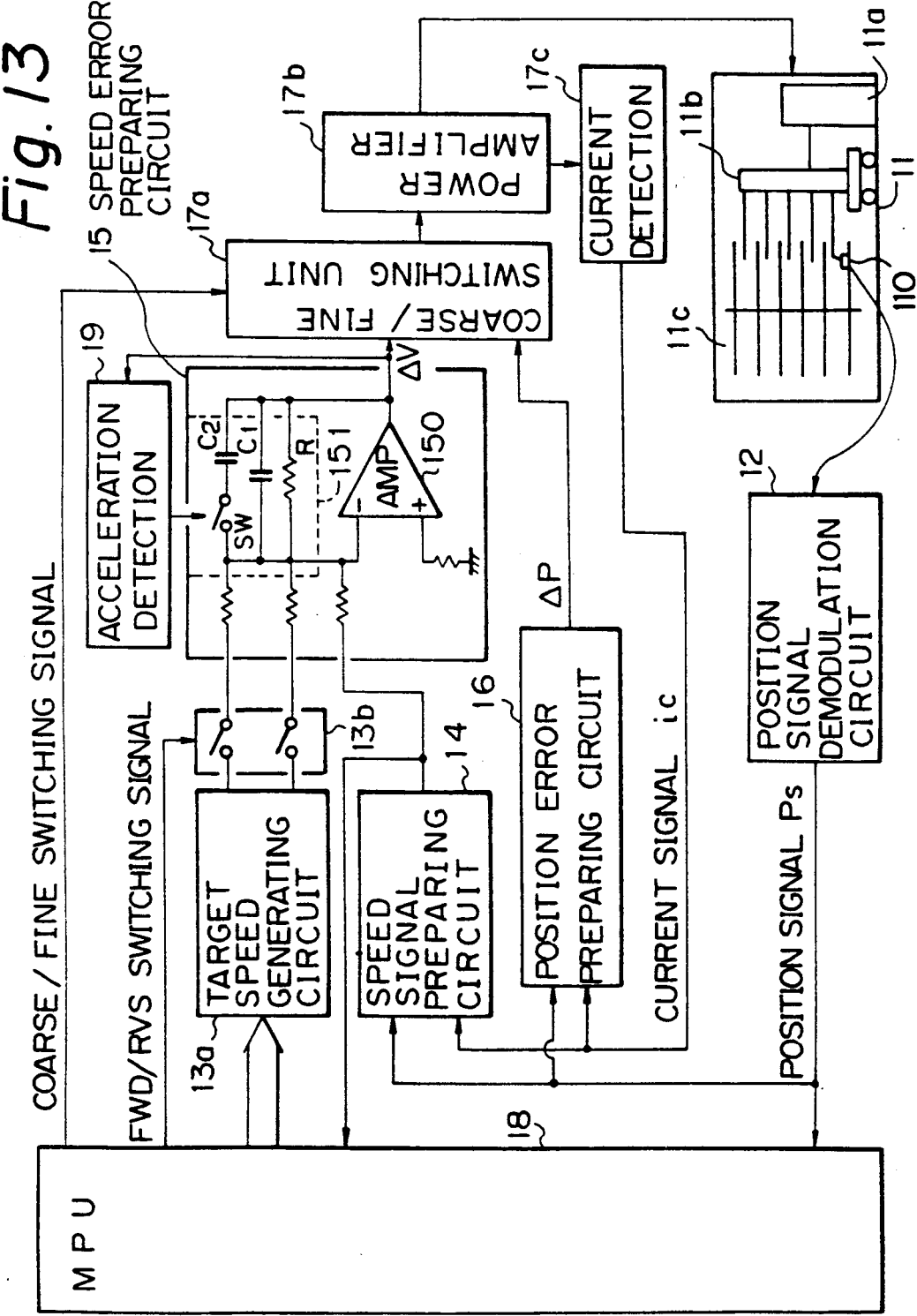

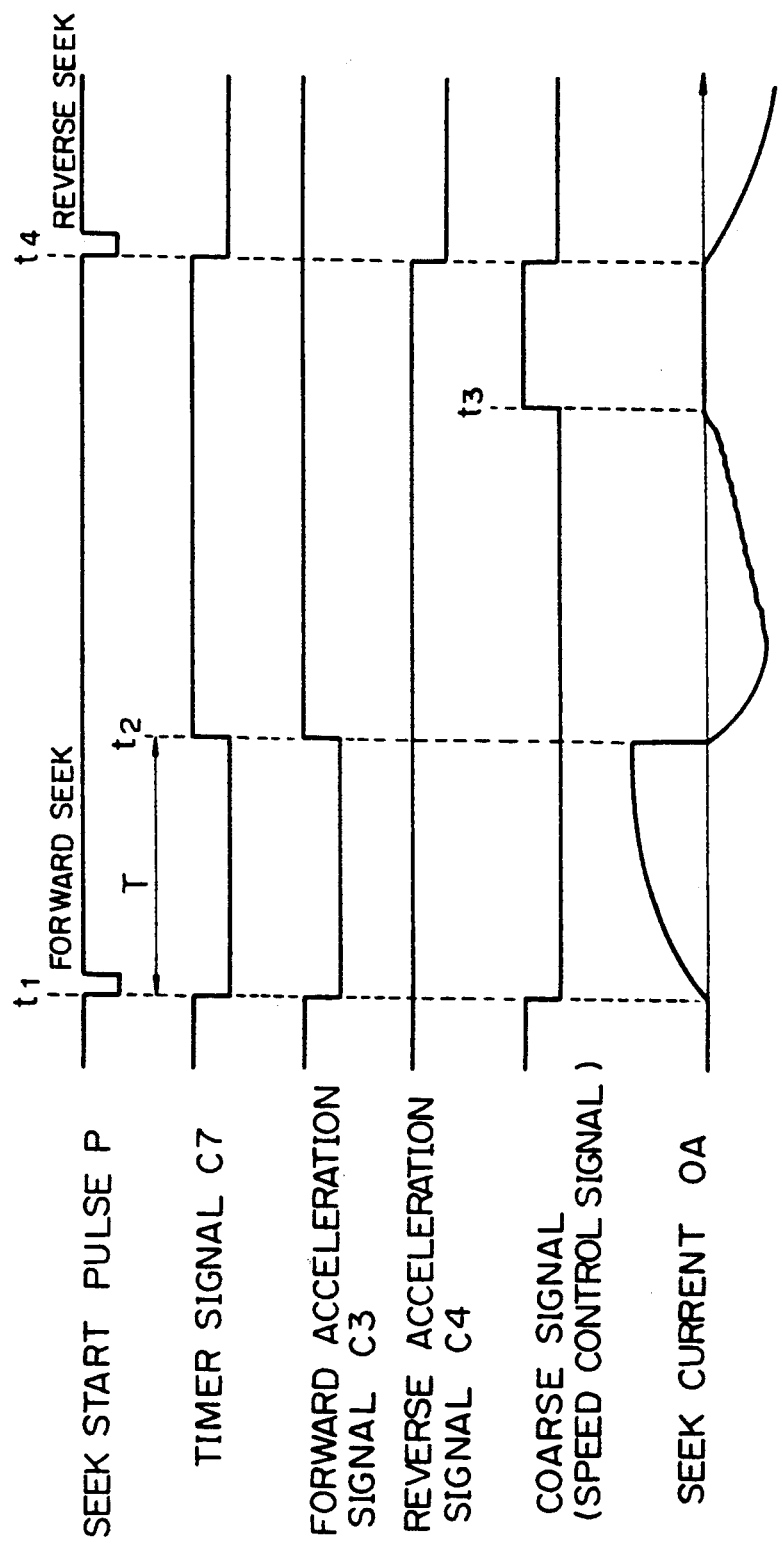

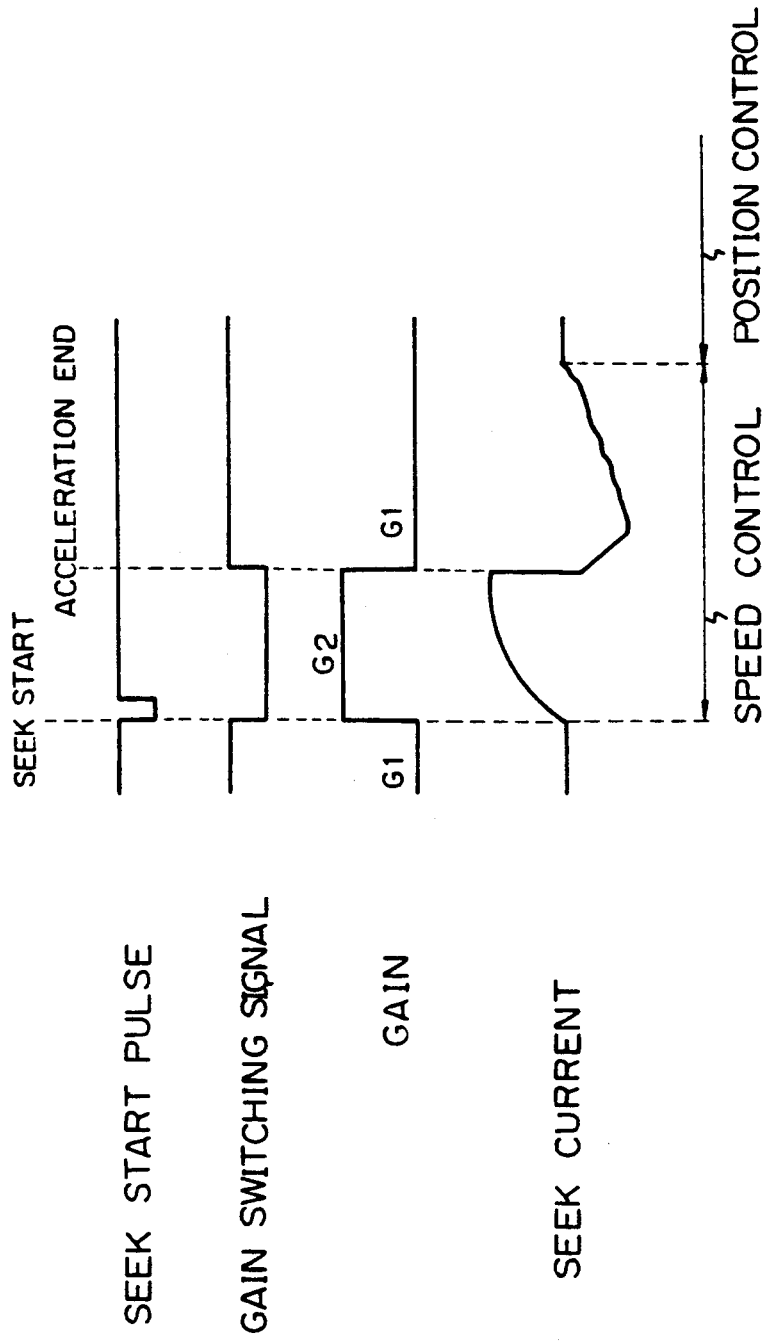

SERVO CIRCUIT FOR MAGNETIC DISK APPARATUS

BACKGROUND OF THE INVENTION

1. Field of the Invention

The present invention relates to a servo circuit for a magnetic disk apparatus which performs speed control over a servo object based on an error between a target speed and a real speed. More particularly, the present invention relates to a servo circuit which performs speed control by passing a seek current, corresponding to the error between the target speed and the real speed, to a voice coil motor and to a speed signal generating circuit for finding the real speed.

2. Description of the Related Art

Servo circuits are used in magnetic disk apparatuses for positioning magnetic heads on specific tracks. In such servo circuits, it is desired to reduce the time required for the speed control and to shorten the access time and to obtain stable positioning even with higher speeds.

In particular, in recent years, higher speeds have been achieved during the seek access operations, which move and stop a head in a disk apparatus at a target track position. Along with the higher speeds of see access operations, much higher speeds have been sought for so-called "one difference" seek access operations wherein the heads are moved to the adjoining track position. A demand has therefore arisen for a servo circuit with a high response commensurate with the higher speeds of "one difference" seek operations.

Explaining the related art in more detail, in a servo circuit, speed control is used up to near the target position, then position control is switched to so as to control the positioning to the target position. However, the frequency characteristic of the servo object has a resonance point, i.e., a resonance point of the servo arm such as the carriage of the servo object. If the frequency of a speed control signal, explained later, appears in the band which covers this resonance point, mechanical oscillation appears during the seek operation and therefore there is no hope for improvement of the floating stability of the magnetic head and the stability after switching to fine control.

The frequency band of an amplifier of a speed error detection circuit, explained later, is determined by the time constant of a resistor and capacitor of a filter. The cut-off frequency must be made smaller than the resonance point. In recent years, however, higher speed access has become desirable. With a "one difference" seek operation, the acceleration/deceleration current cycle of the speed control signal becomes close to the cut-off frequency. Therefore, the current waveform, in particular, the current waveform during acceleration, becomes corrupted and no further current can be passed. Since it is difficult to raise the resonance point, the problem arises that it is difficult to shorten the time for speed control.

In other related art, provision is made of a servo loop for speed control which generates a target speed in accordance with a difference of a current track position from a target track and supplies to a voice coil motor a seek current corresponding to the difference between the target speed and the real speed. Here, the target speed has the characteristic of maintaining a predetermined maximum speed level when the difference is above a predetermined amount and of falling in proportion to a mean value of the difference, for example, when the difference is under a predetermined amount. The target speed becomes the minimum speed level in the case of a difference of one track.

However, with such a servo circuit, since acceleration is performed by passing a seek current corresponding to the difference between a target speed and real speed, determined by the difference at the start of the seek operation, when the target speed level is extremely small, such as with a "one difference" seek operation, the rise of the acceleration current flowing to the voice coil motor becomes slow.

That is, in a "one difference" seek operation, when the seek current begins to flow at the start of the seek operation and the real speed appears, the target speed level is extremely small. Thus, the difference between the real speed and target speed disappears and the seek current is suppressed. As a result, the seek current at the time of acceleration becomes triangular in form, the rise of the acceleration current deteriorates, and the access time of a "one difference" seek operation becomes longer.

In still another servo circuit, provision is made of an additional speed error preparing circuit. This circuit, however, sometimes suffers from loop resonance, which prevents a normal seek operation. Such loop resonance occurs more easily the larger the seek difference. However, if this is prevented by limiting the bands of component circuits so as to try to suppress the oscillation component, the time for the speed control becomes longer and a high speed seek operation, in particular, a high speed seek operation for a small amount of difference such as a difference of one track, becomes difficult.

SUMMARY OF THE INVENTION

A first object of the present invention is to reduce the corruption of the acceleration current at the time of a small difference and shorten the speed control time.

The first object is achieved by a servo circuit for a magnetic disk apparatus having a target speed generating circuit for generating a target speed in accordance with an amount of movement; a speed signal producing circuit for producing a real speed from a position signal from a servo object; and a speed error generating circuit for controlling the speed of the servo object based on an error between the target speed and the real speed. Acceleration and then deceleration control are performed for positioning at the target position in accordance with the amount of movement. Provision is made of an acceleration detection circuit for detecting acceleration in progress from an output of the speed error generating circuit. An acceleration-in-progress detection signal of the acceleration detection generating detection circuit is used for changing a cut-off frequency of the speed error generating circuit between acceleration and deceleration.

A second object of the present invention is to raise the acceleration current excellently and achieve higher speeds even with a small difference.

This is achieved by a servo circuit for a magnetic disk apparatus provided with a servo loop which supplies a seek current, based on an error signal between a target speed and real speed, to a voice coil motor and performs speed control on a head carriage toward a target track position. An addition means is provided in the servo loop for adding a predetermined addition value to the error at the stage of acceleration after a start of the speed control.

A third object of the present invention is to raise the acceleration current excellently and achieve high speed access even if the acceleration/deceleration cycle of the seek current is a "one difference" seek operation close to a cut-off frequency of a servo loop.

This is achieved by a servo circuit for a magnetic disk apparatus provided with a servo loop which supplies a seek current, based on an error between a target speed and real speed, to a voice coil motor and performs speed control on a head carriage toward a target track position. An amplifier circuit positioned at a latter stage of an amplifier circuit determines the frequency characteristic of the servo loop. A gain switching means switches a preset gain to a larger gain between the start of a seek operation and the completion of acceleration.

A fourth object of the present invention is to effectively prevent the occurrence of loop resonance during seek control regardless of the magnitude of the seek difference and to enable a stable, high speed seek operation even in the case of a small difference.

This is achieved by a servo circuit for a magnetic disk apparatus which performs speed control over a servo object based on a speed error between a target speed and a real speed. The servo circuit includes a speed signal generating circuit which generates the real speed of the servo object based on a position signal of the servo object. The speed signal generating circuit is provided with a band changing circuit for changing the band of a speed signal producing circuit in accordance with a seek difference.

BRIEF DESCRIPTION OF THE DRAWINGS

FIGS. 8A to 8H are waveform diagrams operational waveforms in the speed signal generating circuit of the related prior art servo circuit in FIG. 5;

FIG. 9A is a block diagram according to a first embodiment of the present invention;

FIGS. 9B1, 9B2, 9C1 and 9C2 are graphs of the frequency and current according to the first embodiment of the present invention shown in FIG. 9A;

FIG. 12 is a waveform diagram for the first embodiment according to the present invention;

FIG. 13 is a block diagram of a second embodiment according to the present invention;

FIG. 19 is a timing chart of the operation of the third embodiment of FIG. 18;

FIG. 20B is a timing diagram of the fourth embodiment according to the present invention;

DESCRIPTION OF THE PREFERRED EMBODIMENTS

Before describing the preferred embodiments, a more detailed explanation will be given of the related art for background purposes.

Figure 1:
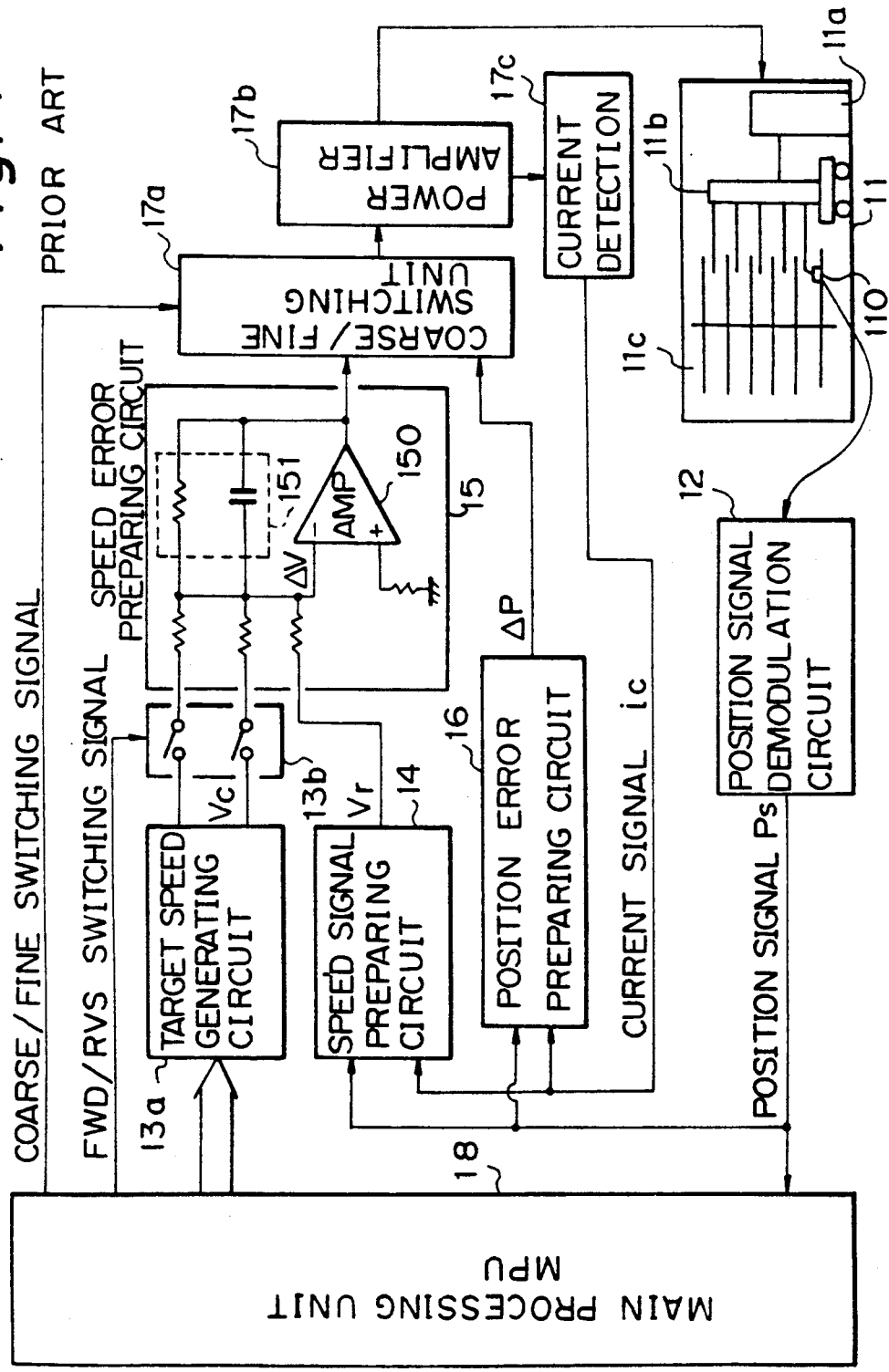
FIG. 1 is a block diagram of a servo circuit according to the prior art.

FIG. 1 is a detailed block diagram of a prior art servo circuit. In the figure, 11 is a servo object, i.e., a magnetic disk mechanism, which has a voice coil motor 11a, a carriage 11b for carrying a magnetic head 110, and a magnetic disk 11c.

Reference numeral 12 is a position signal demodulation circuit which demodulates a position signal Ps from servo information read from the servo surface of a magnetic disk 11c, 13a is a target speed generating circuit which generates a target speed Vc for positioning to a target position in accordance with an amount of movement from a main processing unit 18 (mentioned later), and 13b is a forward (FWD)/reverse (RVS) switching circuit which switches the target speed of the forward direction or target speed of the reverse direction from the target speed generating circuit 13a in accordance with the forward/reverse switching signal of the main processing unit 18.

Reference numeral 14 is a speed signal preparing circuit which prepares a real speed Vr from a position signal Ps and a current signal ic, mentioned later. Reference numeral 15 is a speed error preparing circuit which generates a speed control current (signal) in accordance with a speed error $\Delta V$ between a target speed Vc and a real speed Vr and has an amplifier 150 for generating the speed error $\Delta V$ and a filter 151.

Reference numeral 16 is a position error preparing circuit which produces a position error from the position signal Ps and current signal ic and generates a position control signal. Reference numeral 17a is a coarse/fine switching unit which switches from speed control of the speed error preparing circuit 15 to position control of the position error preparing circuit 16 by a coarse (speed control)/fine (position control) switching signal from the main processing unit.

Reference numeral 17b is a power amplifier which amplifies the output of the switching unit 17a and drives the voice coil motor 11a of the magnetic disk mechanism 11. Reference numeral 17c is a current detection circuit which detects the drive current of the power amplifier 17b and generates a current signal ic.

Reference numeral 18 is a main processing unit which is formed by a microprocessor. The main processing unit 18 detects the position in accordance with the position signal Ps, outputs a remaining movement to a target speed generating circuit 13a, generates a forward-/reverse switching signal in accordance with the forward/reverse direction, and generates a coarse/fine switching signal near the target position.

Figure 2A:
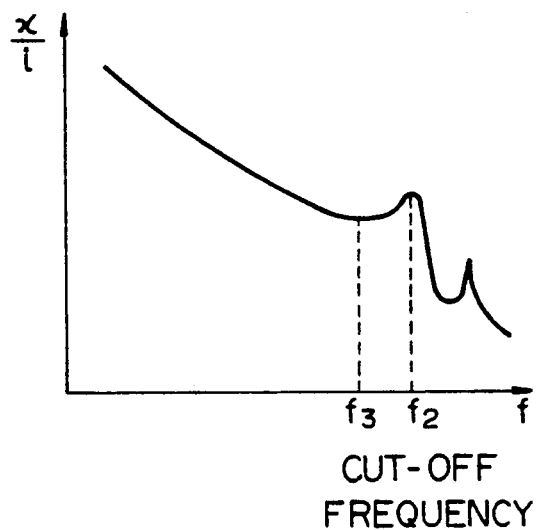
FIGS. 2A and 2B are graphs of the frequency characteristics according to the prior art device in FIG. 1.

In this servo circuit, speed control is used up to near the target position, then position control is switched to so as to control the positioning to the target position. However, the frequency characteristic of the servo object 11 has the resonance point f2 as shown in FIG. 2A. This resonance point f2 is a torsional resonance point of the servo arm such as the carriage 11b of the servo object 11.

If the frequency of the speed control signal appears in the band which covers this resonance point, mechanical vibration appears during the seek operation (movement) and therefore there is no hope for improvement of the floating stability of the magnetic head 110 and the stability after switching to fine control.

Figure 2B:
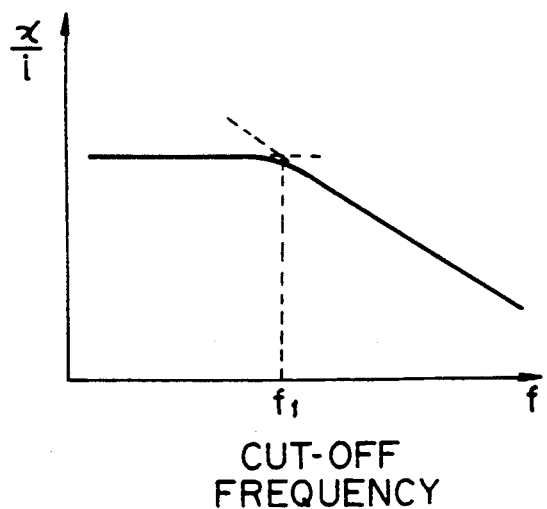

Therefore, the frequency band of the amplifier 150 of the speed error detection circuit 15 is determined by the time constants of the resistor and capacitor of the filter 151. The cut-off frequency f1 of the frequency band shown in FIG. 2B must be made smaller than f2, for example, f2 = 2 f1 to 1.5 f1.

Figure 3:
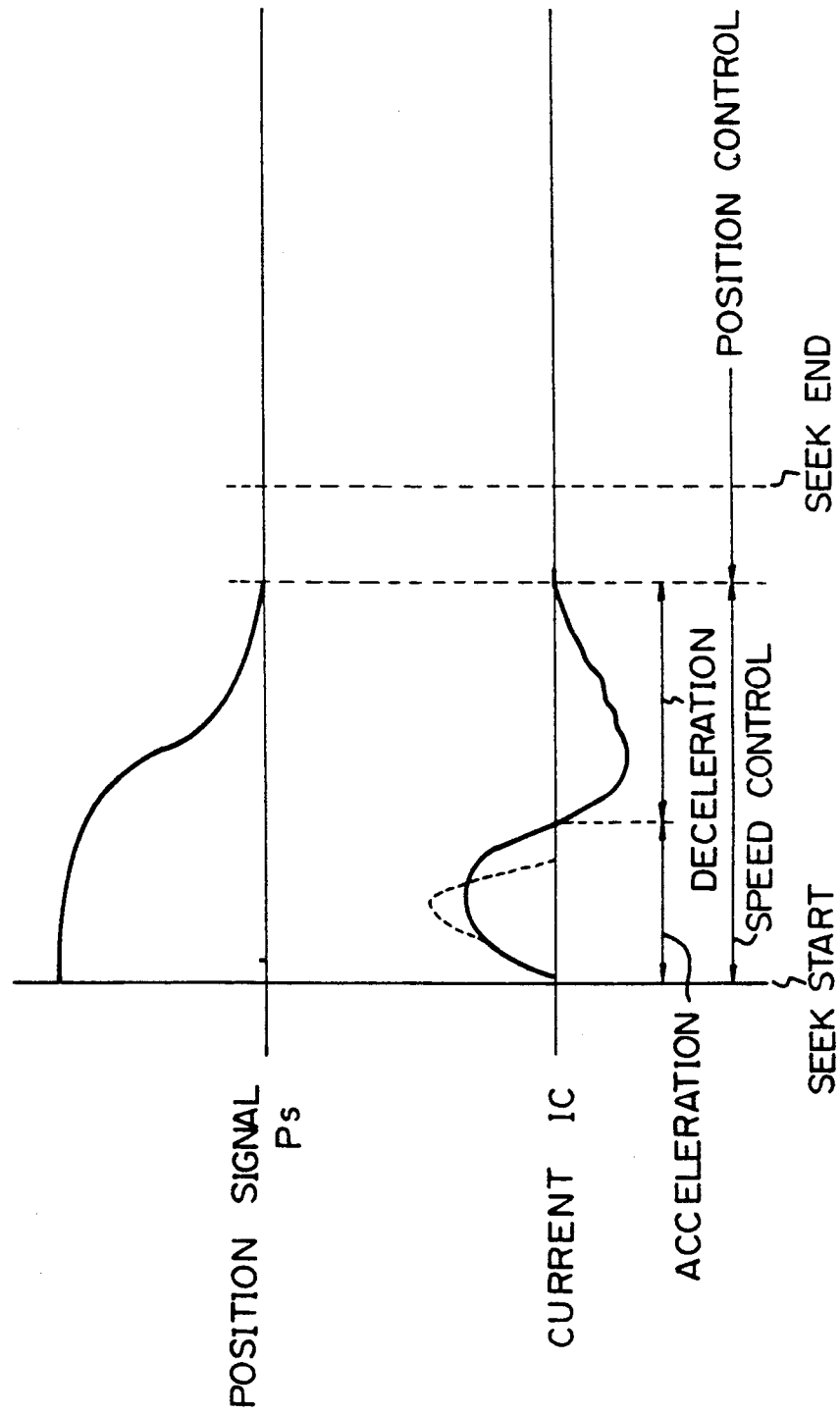
FIG. 3 is a diagram explaining the problems in the prior art.

In recent years, however, higher speed access times have become desirable. With a "one difference" seek operation, as shown in FIG. 3, the acceleration/deceleration current IC cycle of the speed control signal has become close to the cut-off frequency f1. Therefore, as shown by the solid line of FIG. 3, the current waveform IC, in particular, the current waveform during acceleration, becomes corrupted and no further current can be passed, as shown by the dotted line. Since it is difficult to raise the resonance point f2 of the mechanical characteristics, the problem arises that it is difficult to shorten the time for speed control.

In another related art, provision is made of a servo loop for speed control which generates a target speed in accordance with a difference of a current track position with a target track. The servo control supplies a seek current to the voice coil motor corresponding to the difference between the target speed and the real speed.

Here, the target speed has the characteristic of maintaining the predetermined maximum speed level when the difference is above a predetermined value and of falling in proportion to a mean value of the difference, for example, when the difference is below a predetermined value. The target speed becomes the minimum speed level when there is a difference of one track.

However, with such a servo circuit, since acceleration is performed by passing a seek current corresponding to a difference between the target speed and real speed determined by the difference at the start of the seek operation, when the target speed level is extremely small, such as with a "one difference" seek operation, the rise of the acceleration current flowing to the voice coil motor becomes slow.

Figure 4:
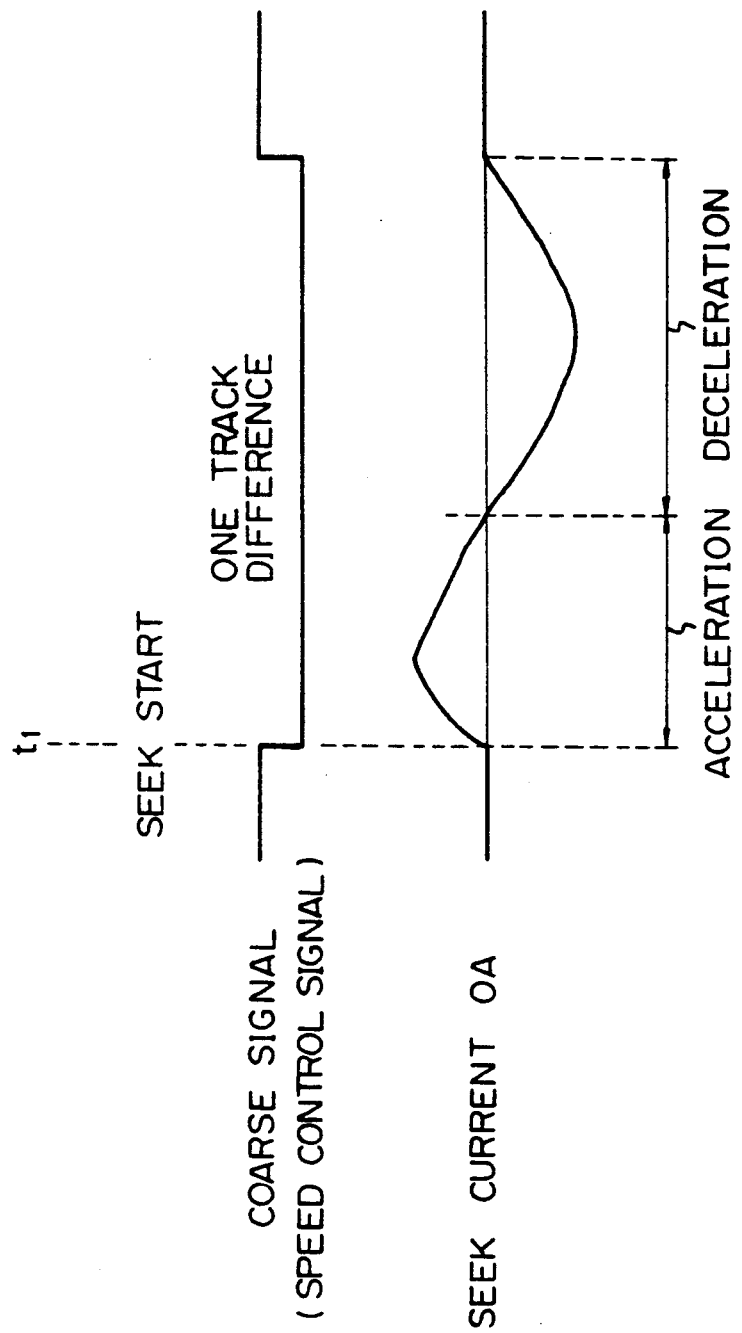
FIG. 4 is a diagram explaining a conventional "one difference" seek operation.

That is, as shown in FIG. 4, in a "one difference" seek operation, when the seek current begins to flow at the start of the seek operation at the time t1 and the real speed appears, the target speed level is extremely small. The difference between the real speed and target speed disappears and the seek current is suppressed. As a result, the seek current at the time of acceleration becomes triangular in form, the rise of the acceleration current OA deteriorates, and the access time of a "one difference" seek operation becomes longer.

Figure 5:
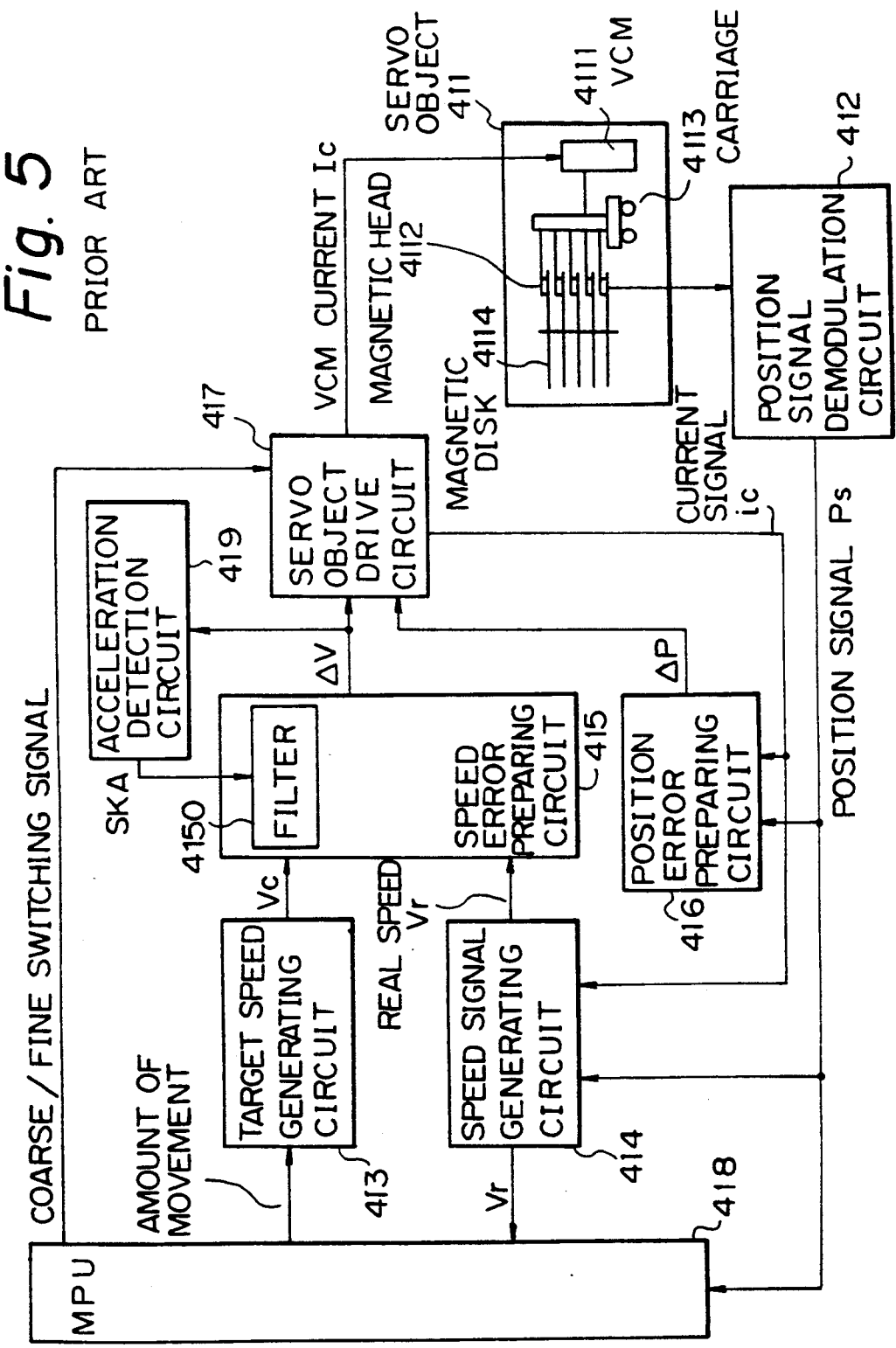
FIG. 5 is a block diagram of a related prior art servo circuit.

FIG. 5 is a block diagram showing the basic construction of another servo circuit previously proposed by the applicant to meet this demand ("related" servo circuit). In FIG. 5, reference numeral 411 is a magnetic disk mechanism used as the servo object. This is provided with a voice coil motor VCM 4111, a carriage 4113 mounting a magnetic head 4112, and a magnetic disk 4114.

Reference numeral 412 is a position signal demodulation circuit which demodulates a position signal Ps showing the position o movement from servo information read by the servo head 4112 from the servo surface of the magnetic disk 4114.

Reference numeral 413 is a target speed generating circuit which generates a target speed Vc for positioning the magnetic head 4112 of the servo object 411 at a target position in accordance with an amount of movement commanded by a main processing unit.

Reference numeral 414 is a speed signal generating circuit which prepares a real speed Vr of the magnetic head 4112 in the servo object 411 from the position signal Ps and the current signal ic. The current signal ic is a compensating signal which is added for the smooth production of the real speed Vr.

Reference numeral 415 is a speed error preparing circuit which is provided internally with a filter 4150. The speed error preparing circuit 415 generates a speed error signal $\Delta V$ for controlling the servo object 411 based on a speed error between the target speed Vc and the real speed Vr.

Reference numeral 416 is a position error preparing circuit which produces a position error of the servo object 411 with respect to a target position from the position signal Ps and the current signal ic and generates the position control signal $\Delta P$.

Reference numeral 417 is a servo object drive circuit which performs processing for switching from speed control by the speed error preparing circuit 415 to the position control of the position error preparing circuit 416 by a coarse (speed control)/fine (position control) switching signal from the main processing unit. The servo object drive circuit 417 amplifies the power of the error signal $\Delta V$ or $\Delta P$, performs processing for outputting the voice coil motor current Ic for driving the voice coil motor 4111 of the servo object 411, detects the voice coil motor current Ic, and performs processing for generating the current signal ic.

Reference numeral 418 is a main processing unit which is formed by a microprocessor, detects the position of the magnetic head 4112 based on the position signal Ps, outputs the remaining amount of movement, i.e., the remaining difference, to the target speed generating circuit 413, and generates a coarse/fine switching signal near the target speed.

Reference numeral 419 is an acceleration detecting circuit, which detects the speed error signal ΔV generated by the speed error preparing circuit 415 and generates an acceleration-in-progress signal SKA which changes the band of the speed error preparing circuit 415 in accordance with the amount of seek difference during acceleration and deceleration.

The servo circuit constructed as above performs speed control up to near the target position and then switches to position control and performs control for positioning to the target position. This control operation is basically the same as the servo control operations of conventional servo circuits, so the remaining explanation will primarily concentrate on the operation of the speed error preparing circuit 415 referring to FIGS. 6A and 6B.

When the speed control starts due to a command from the main processing unit 418, the target speed generating circuit 413 generates a target speed Vc during acceleration control from the amount of movement, that is, amount of difference, commanded by the main processing unit 418.

Further, the speed signal generating circuit 414 receives the position signal Ps from the position signal demodulation circuit 412 and the current signal ic from the servo object drive circuit 417 and prepares a real speed Vr of the servo object 411 (magnetic head).

The speed error preparing circuit 415 generates a speed error signal ΔV corresponding to the speed error between the target speed Vc generated by the target speed generating circuit 413 and the real speed Vr generated by the speed signal generating circuit 414.

On the other hand, the acceleration detecting circuit 419 detects from the speed error signal ΔV generated by the speed error preparing circuit 415 that the speed error preparing circuit 415 is in the middle of acceleration control and thereupon adds the acceleration-in-progress signal SKA to the speed error preparing circuit 415.

Figure 6A:
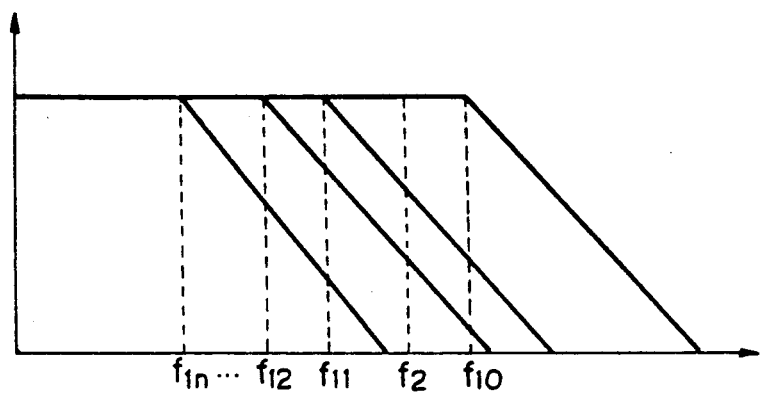
FIGS. 6A and 6B are graphs of the operational characteristics of the related prior art servo circuit in FIG. 5.

When the filter 4150 of the speed error preparing circuit 415 receives the acceleration-in-progress signal SKA from the acceleration detecting circuit 419, the cut-off frequency f10 becomes infinitely large or higher than even the resonance point f2 of the servo object 411. Due to this, the cut-off frequency f10 of the speed error preparing circuit 415 during acceleration control becomes infinitely large or higher than even the resonance point f2 of the servo object 411 as shown in FIG. 6A. The finitely large cut-off frequency f10 in this case is set to a high frequency in a range where no oscillation will occur in the acceleration current.

The servo object drive circuit 417 amplifies the power of the speed error signal ΔV received from the speed error preparing circuit and outputs the voice coil motor current Ic for driving by acceleration the voice coil motor 4111 of the servo object 411 and also generates a current signal ic, i.e., the detected current of the voice coil motor current Ic.

Figure 6B:
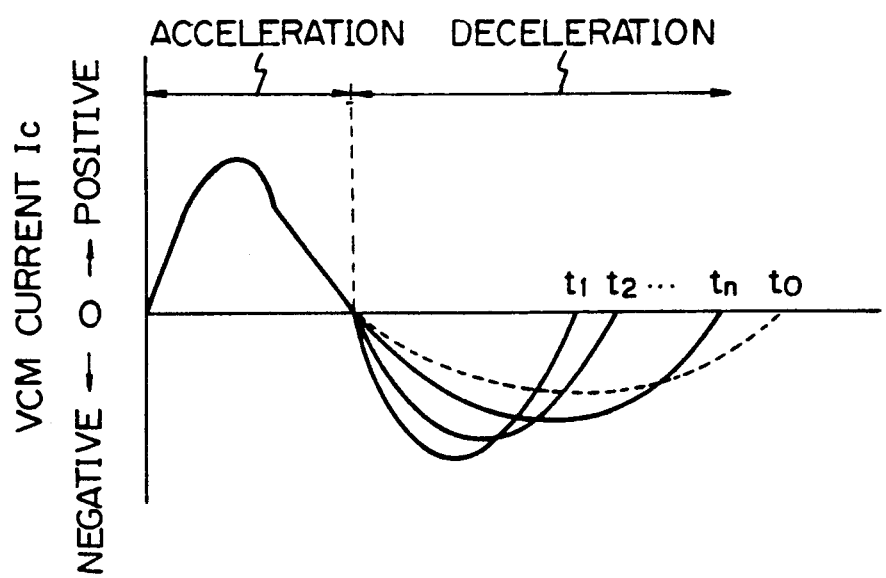

By this, the curve of the voice coil motor current Ic corresponding to the speed error signal ΔV generated by the speed error preparing circuit 415 during acceleration control becomes a very clean, sharply inclined signal, as shown by FIG. 6B, so it is possible to end the acceleration control in a short time.

When the acceleration control is ended, the main processing unit 418 switches to deceleration control.

When deceleration control is switched to upon the command of the main processing unit 418, the target speed generating circuit 413 generates a target speed Vc for deceleration control. The speed error preparing circuit 415 generates a speed error signal ΔV (negative) corresponding to the speed error between a target speed Vc generated by the target speed generating circuit 413 and the real speed Vr generated by the speed signal generating circuit 414.

On the other hand, the acceleration detecting circuit 419 stops the generation of the acceleration-in-progress signal SKA upon completion of the acceleration control of the speed error preparing circuit 415.

When the speed error preparing circuit 415 enters deceleration control, the filter 4150 of the speed error preparing circuit 415 lowers the cut-off frequency to a frequency below the resonance point f2 of the servo object 411. At this time, the larger the difference, the lower the cut-off frequency is made. By this, the cut-off frequency of the speed error preparing circuit 415 during deceleration control is reduced to f11, f12, . . . f1n the larger the amount of difference, as shown in FIG. 6A.

The servo object drive circuit 417 amplifies the power of the speed error signal ΔV received from the speed error preparing circuit 415 and outputs a voice coil motor current Ic corresponding to the seek current for controlling, under deceleration, the voice coil motor 4111. The servo object drive circuit 417 also generates a current signal ic, i.e., the detected current of the voice coil motor current Ic.

By this, the curve of the deceleration current, i.e., the voice coil motor current Ic corresponding to the speed error signal ΔV generated by the speed error preparing circuit 415 during deceleration control, becomes as shown in FIG. 6B. That is, there is less corruption of the deceleration curve the smaller the amount of difference, and the deceleration control time, that is, the speed control time, falls such as tn, . . . t2, t1.

In the above way, the cut-off frequency of the speed error preparing circuit is made to change between the time of acceleration control and deceleration control. Also, the cut-off frequency during deceleration control is made to change in accordance with the amount of different. Therefore, during acceleration control, the corruption of the acceleration current supplied to the servo object can be reduced and the degree of corruption of the deceleration current during deceleration control can be reduced the less the amount of difference. Thus, even when the amount of difference is small, it is possible to stably shorten the speed control time. By this, it is possible to perform speed control stably and at a high speed even with an extremely small difference such as a difference of one track and thus stable, high speed seek operations become possible.

Figure 7:
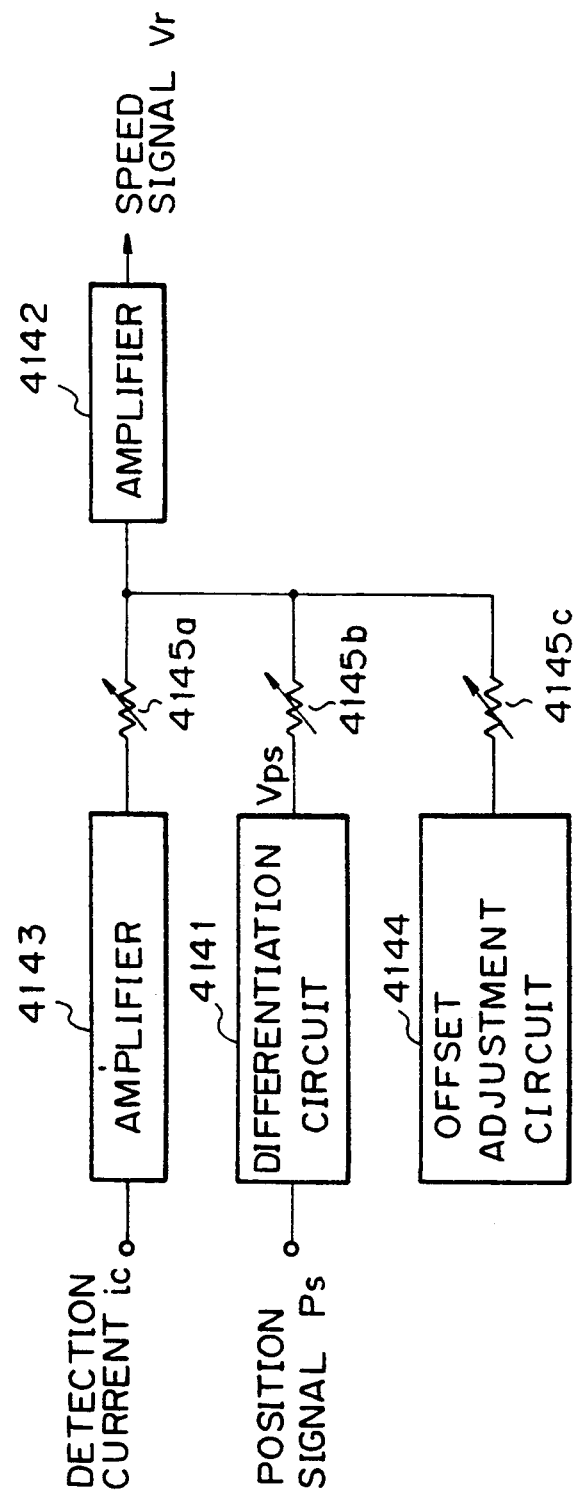
FIG. 7 is a block diagram of a speed signal generating circuit in the related prior art servo circuit in FIG. 5.

Next, an explanation will be made of the construction and operation of the speed signal generating circuit 414 referring to FIG. 7 and FIGS. 8A to 8H. In FIG. 7, reference numeral 4141 is a differential circuit which differentiates the position signal Ps and generates a differential speed Vps. Reference numeral 4143 is an amplifier which amplifies the current signal ic up to a predetermined level.

Reference numeral 4144 is an offset adjusting circuit which generates an offset compensating signal for adjusting the offset of the real speed Vr generated from the speed signal generating circuit 414.

Reference numerals 4145a to 4145c are variable resistors. The variable resistor 4145a is used to adjust the output gain of the amplifier 4143a, the variable resistor 4145b is used to adjust the output gain of the differential circuit 4141, and the variable resistor 4145c is used to adjust the output gain of the offset adjusting circuit 4144.

Reference numeral 4142 is a real speed generating circuit which amplifies and integrates the added signal of the level adjusted differential signal Vps, current speed ic, and the offset signal and prepares the real speed Vr.

In this construction, the position signal Ps shown in FIG. 8A is applied to the differential circuit 4141 from the position signal demodulation circuit 412. The position signal Ps has a waveform which crosses zero each time the magnetic head passes through the track. The differential circuit 4141 differentiates the position signal Ps and generates a differential speed Vps shown in FIG. 8B. This differential speed Vps becomes zero at each of the largest points of the position signal Ps and peaks at each point where it crosses zero. The envelope connecting the peaks gives the real speed Vr of the servo object 411 (magnetic head).

If just the differential signal Vps generated from the differential circuit 4141 is given to the real speed generating circuit 4142, differentiation is performed and the envelope of the differential speed Vps is obtained. In this case, at places where the peak interval of the differential speed Vps is small, that is, at places where the real speed Vr is high, a good envelope characteristic is obtained, but at places with large peak intervals, that is, places of slow speed (starting and ending times of seek operations), good envelope characteristics cannot be obtained. To correct the deviations in the envelope characteristics, the current signal ic may be added.

The current signal ic shown in FIG. 8C from the servo object drive circuit 417 is amplified by the amplifier 4143 and added to the differential speed Vps. The current signal ic resembles the voice coil motor current Ic supplied to the servo object and can effectively correct the deviations in the envelope mentioned earlier.

The real speed generating circuit 4142 integrates and amplifies the added signal of the differential speed Vps, the current signal ic, and the offset correction signal and generates a real speed Vr having a smooth characteristic shown in FIG. 8D. Note that since an accurate real speed Vr is produced, the output gains of the current signal ic, the differential speed Vps, and the offset correction signal are initialized by the variable resistors 4145a to 4145c.

The speed signal generating circuit 414 in the related servo circuit has a fixed frequency band regardless of the seek difference. The band of the speed signal generating circuit 414 is defined by the band of the real speed generating circuit 4142, that is, the time constants of the integration resistor 4142b and capacitor 4142c.

Therefore, when oscillation is generated during seek acceleration control due to the mechanical resonance of the servo object 411, as shown in FIG. 8E, the position signal Ps takes on a waveform with the oscillation superposed. When the amount of movement of the servo object 411 (magnetic head), that is, the amount of seek difference, is large, the acceleration time and the acceleration voice coil motor current Ic become large, so oscillation readily occurs.

When oscillation is generated in the position signal Ps in this way, oscillation is also caused in the differential speed Vps as shown in FIG. 8F, and oscillation is caused in the real speed Vr generated by the real speed generating circuit 4142 (FIG. 8G).

Since this oscillating real speed Vr is received and oscillation occurs in the speed error signal $\Delta V$ generated by the speed error preparing circuit 415, oscillation also occurs in the voice coil motor current Ic generated by the servo object drive circuit 417 (FIG. 8H).

As a result, the amplitude of the servo object 411 is amplified, loop resonance occurs, and a normal seek operation is no longer possible. Such loop resonance occurs more easily the larger the seek difference, but if this is prevented by limiting the bands of one or both of the speed signal generating circuit 414 and the speed error preparing circuit 415 so as to try to suppress the oscillation component, the time for the speed control becomes longer and a high speed seek operation, in particular, a high speed seek operation with a small amount of difference such as a difference of one track, becomes difficult. This is a problem of not only the related servo circuit, but conventional servo circuits as well.

FIGS. 9A to 9C are a block diagram and graphs of the frequency characteristics, respectively, of a first embodiment according to the present invention.

According to the first embodiment of the present invention, there is provided a servo circuit for a magnetic disk apparatus having a target speed generating circuit 13a for generating a target speed in accordance with an amount of movement; a speed signal preparing circuit 14 for producing a real speed from a position signal from a servo object 11; and a speed error generating circuit 15 for controlling the speed of the servo object 11 based on an error between the target speed and the real speed; in accordance with the amount of movement, acceleration and then deceleration control are performed for positioning at the target position. Provision is made for an acceleration detection circuit 19 for detecting acceleration in progress from an output of the speed error generating circuit 15. An acceleration-in-progress detection signal from the acceleration detection circuit 19 is used for changing a cut-off frequency of the speed error generating circuit 15 during acceleration and deceleration.

Explanation of the mode of operation of the first embodiment of the present invention in more detail will be given with respect to FIGS. 9B and 9C. As shown by FIGS. 9B and 9C, the cut-off frequency is made infinitely large or a large f2 during acceleration is changed to a small f1 during deceleration, thereby reducing the corruption of the acceleration current during acceleration.

During acceleration, the power amplifier does not function as a current source. A voltage large enough that a power source voltage is applied to the motor is input, so merely the acceleration current increases. This is equivalent to no servo control being exercised. Therefore, even if the cut-off frequency is made infinitely large or large, it is difficult for mechanical (servo object) oscillation to occur. Accordingly, the cut-off frequency may be made large, the corruption of the acceleration current reduced, and the acceleration time shortened.

Due to this, as shown by the solid lines of FIGS. 9B and 9C, the acceleration time is shortened compared with the prior art shown by the dotted line and therefore the speed control time can be shortened.

Further, during deceleration, the cut-off frequency is returned to f1, so mechanical oscillation does not occur overall.

Figure 10:
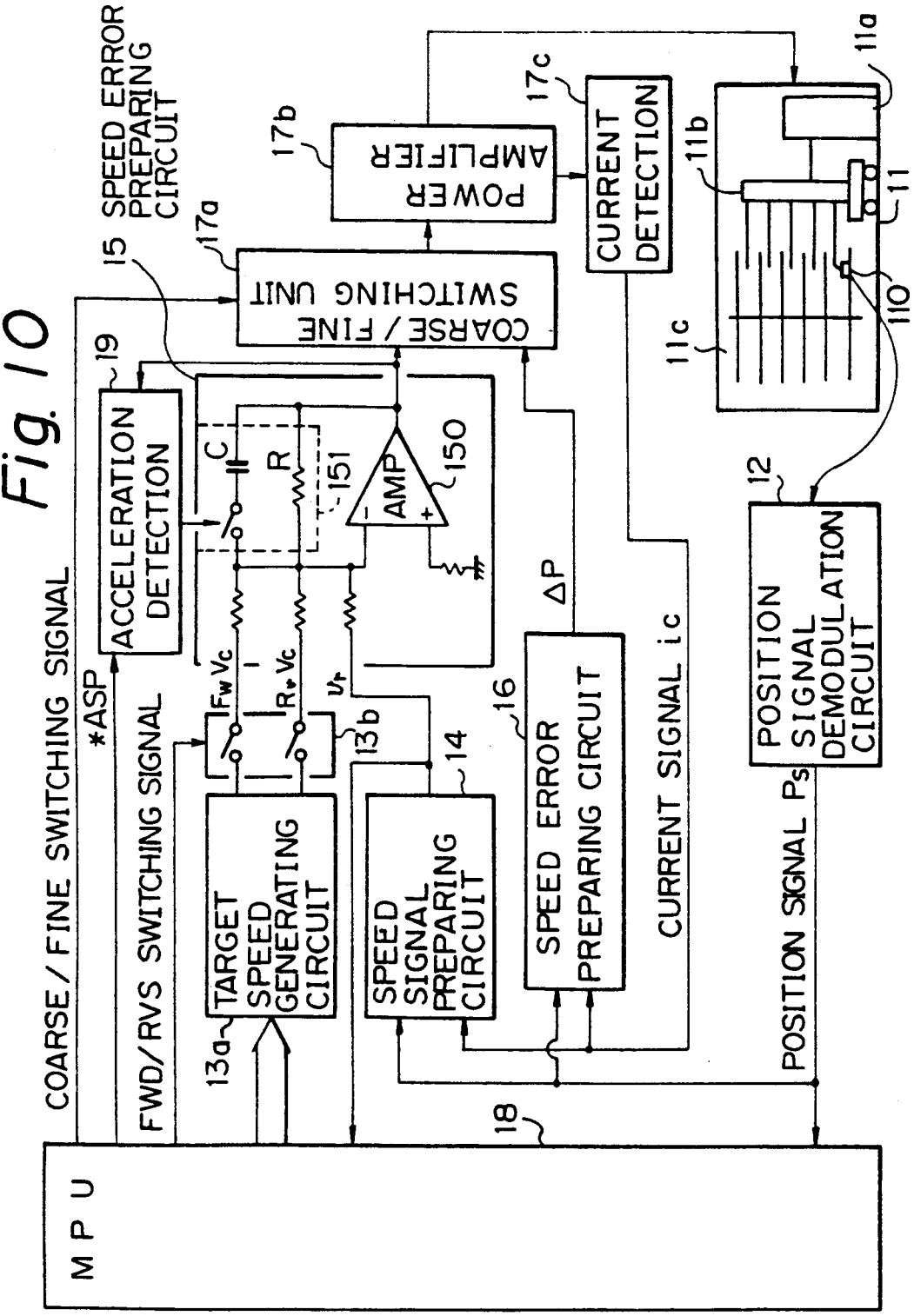
FIG. 10 is a detailed block diagram of the first embodiment according to the present invention.
Figure 11:
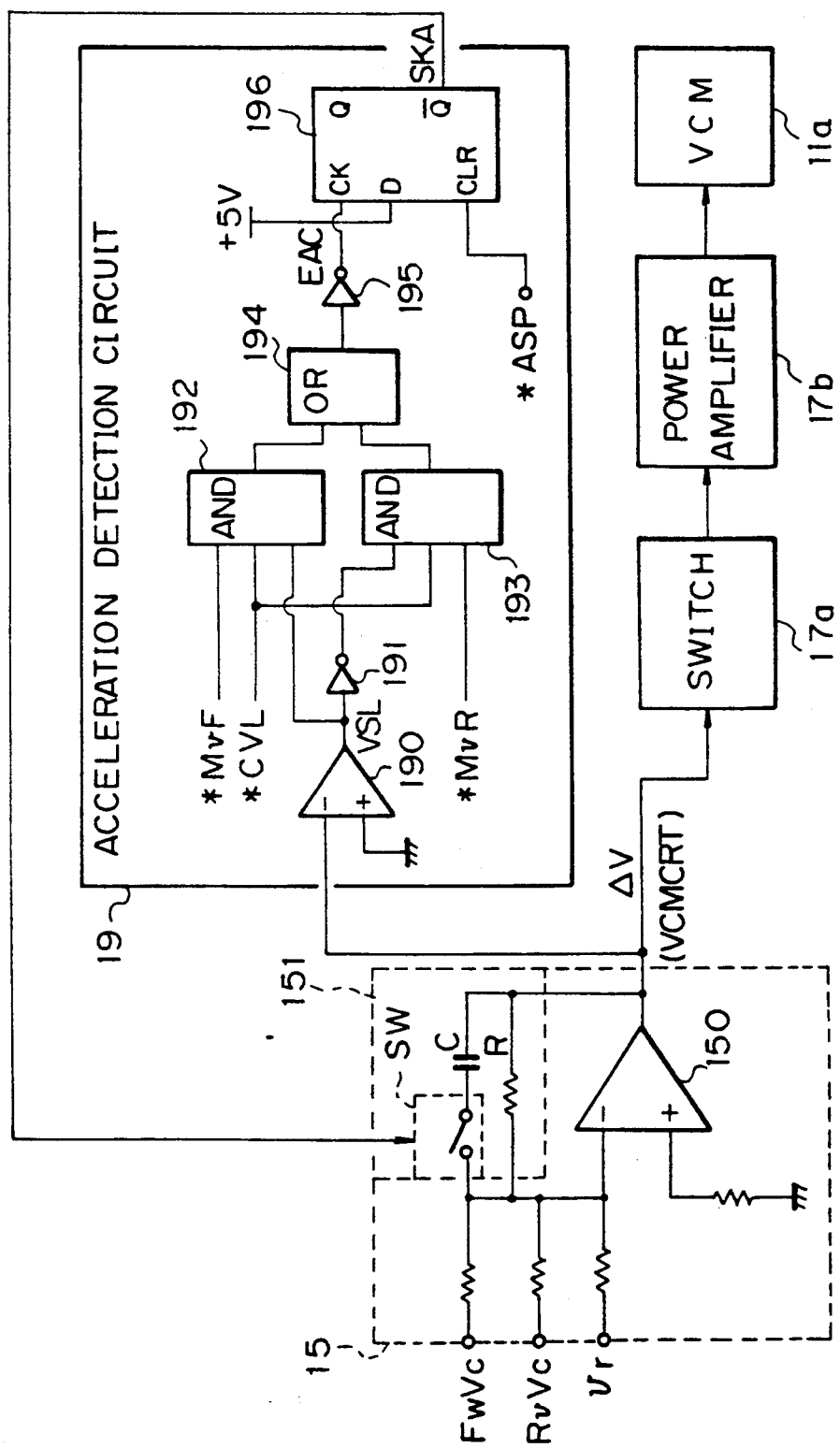
FIG. 11 is a block diagram of the main parts of the first embodiment shown in FIG. 10.

FIG. 10 is a detailed block diagram of the first embodiment according to the present invention. FIG. 11 is a detailed block diagram of key parts of FIG. 10. In FIGS. 10 and 11, portions the same as those shown in FIG. 9A are given the same reference numerals.

In FIG. 11, the filter 151 in the speed error generating circuit 15 is formed by a parallel circuit of a resistance R with a switch SW and a capacitor C.

Reference numeral 190 in FIGS. 10 and 11 is a comparator which performs zero volt slicing of the output VCMCRT (speed error current) of the amplifier 150 and outputs a speed slice signal VSL. Reference numeral 191 is an inversion circuit which inverts the speed slice signal VSL.

Reference numerals 192 and 193 are each three-input AND gates which generate a high level output only when all of the three inputs are high level. The AND gate 192 obtains the high level AND of the forward movement signal *MvF from the main processing unit (MPU) 18, the capture velocity signal *CVL generated when the real speed from the main processing unit 18 is less than a predetermined level, and the output of the comparator 190. The AND gate 193 obtains the high level AND of the reverse movement signal *MvR from the main processing unit 18, the capture velocity signal *CVL from the main processing unit 16, and the output of the comparator 191.

Reference numeral 194 is an OR gate which obtains the OR of the outputs of the AND gates 192 and 193. Reference numeral 195 is an inversion circuit which inverts the output of the OR gate 194 and generates an end acceleration signal EAC.

Reference numeral 196 is a flip-flop which is cleared by an access start *ASP from the main processing unit 18, inverts using as a clock the end acceleration signal EAC, and generates an acceleration-in-progress signal SKA from the $\overline{Q}$ output.

FIG. 12 is a waveform diagram of key parts of the first embodiment of the present invention.

In forward movement, the main processing unit 18 generates a target speed $FwV_c$ in the forward direction from the target speed generating circuit 13a. The main processing unit 18 generates a forward movement signal *MvF. Further, in the case of a small difference and small speed, it generates a capture velocity signal *CVL from the real speed Vr.

In the speed error preparing circuit 15, the speed error between the target speed FwVc and the real speed Vr is obtained at the amplifier 150 and a speed error signal ΔV is generated.

At this time, the flip-flop 196 of the acceleration detection circuit 19 is cleared by the access start signal *ASP generated along with the start of the seek operation (access), so a high level acceleration-in-progress signal SKA is generated from the $\overline{Q}$ output.

By this, the switch SW of the filter 151 turns off, the cut-off frequency of the amplifier 150 becomes infinitely large, and the speed error signal ΔC rises sharply.

The speed error signal ΔV is zero volt sliced by the comparator 190, so when the speed error signal ΔV is positive, a high level speed slice signal VSL is generated.

Therefore, a high level output is generated from the AND gate 192 and a low level end acceleration signal EAC is generated through the OR gate 194 and the inversion circuit 195.

When the speed error signal ΔV becomes zero, the speed slice signal VSL of the comparator 190 becomes the low level, the output of the AND gate 192 becomes the low level, the end acceleration signal EAC through the OR gate 194 and inversion circuit 195 becomes the high level, the flip-flop 196 inverts using this point of change as a clock, and the acceleration-in-progress signal SKA of the $\overline{Q}$ output becomes the low level.

Therefore, the switch SW of the filter 151 turns on and the cut-off frequency of the amplifier 150 becomes f1.

In the succeeding deceleration period, the speed error signal ΔV is restricted in band by the cut-off frequency f1.

Due to this, the current VCMCRT flowing through the power amplifier 17b to the voice coil motor 11a rises substantially linearly during the acceleration period as shown in FIG. 12.

On the other hand, during a reverse movement, when starting the access for a difference of one track, the main processing unit 18 generates an access start signal *ASP, generates a reverse direction target speed RvVc from the target speed generating circuit 13a, generates a reverse movement signal *MvR, and generates a capture velocity signal *CVL after slicing the speed signal and detecting the speed-down.

In the speed error preparing circuit 15, the speed error between the target speed RvVc and the real speed Vr is obtained and the speed error signal ΔV is generated.

At this time, due to the access start signal *ASP, the flip-flop 196 of the acceleration detection circuit 19 is cleared, so a high level acceleration-in-progress signal SKA is generated from the $\overline{Q}$ output.

By this, the switch SW of the filter 151 is turned off, the cut-off frequency of the amplifier 150 is made infinitely large, and the speed error signal ΔV rises sharply.

The speed error signal ΔV is zero volt sliced by the comparator 190. When the speed error signal ΔV is negative, a low level speed slice signal VSL is generated.

Therefore, a high level output is generated from the AND gate 193, and a low level end acceleration signal EAC is generated through the OR gate 194 and the inversion circuit 195.

When the speed error signal ΔV becomes zero, the speed slice signal VSL of the comparator 190 becomes high level, the output of the AND gate 193 becomes low level, the end acceleration signal EAC through the OR gate 194 and inversion circuit 195 becomes high level, the flip-flop 196 inverts using this point of change as a clock, and the acceleration-in-progress signal SKA of the $\overline{Q}$ output becomes low level.

Therefore, the switch SW of the filter 151 turns off, and the cut-off frequency of the amplifier 150 becomes f1.

As a result, during the deceleration period, the speed error signal ΔV is limited in band by the cut-off frequency f1.

By this, the current VCMCRT flowing through the power amplifier 17b to the voice coil motor 11a rises substantially linearly during the acceleration period as shown in FIG. 12.

In this way, in a "one difference" seek operation, the switch SW of the filter 151 is turned off by the access start signal, the cut-off frequency is made infinitely large, switch SW is turned on by the end of the acceleration, and the cut-off frequency becomes f1, which is determined by the capacitor C and the resistor R.

FIG. 13 is a detailed block diagram of a second embodiment according to the present invention.

Figure 25A:
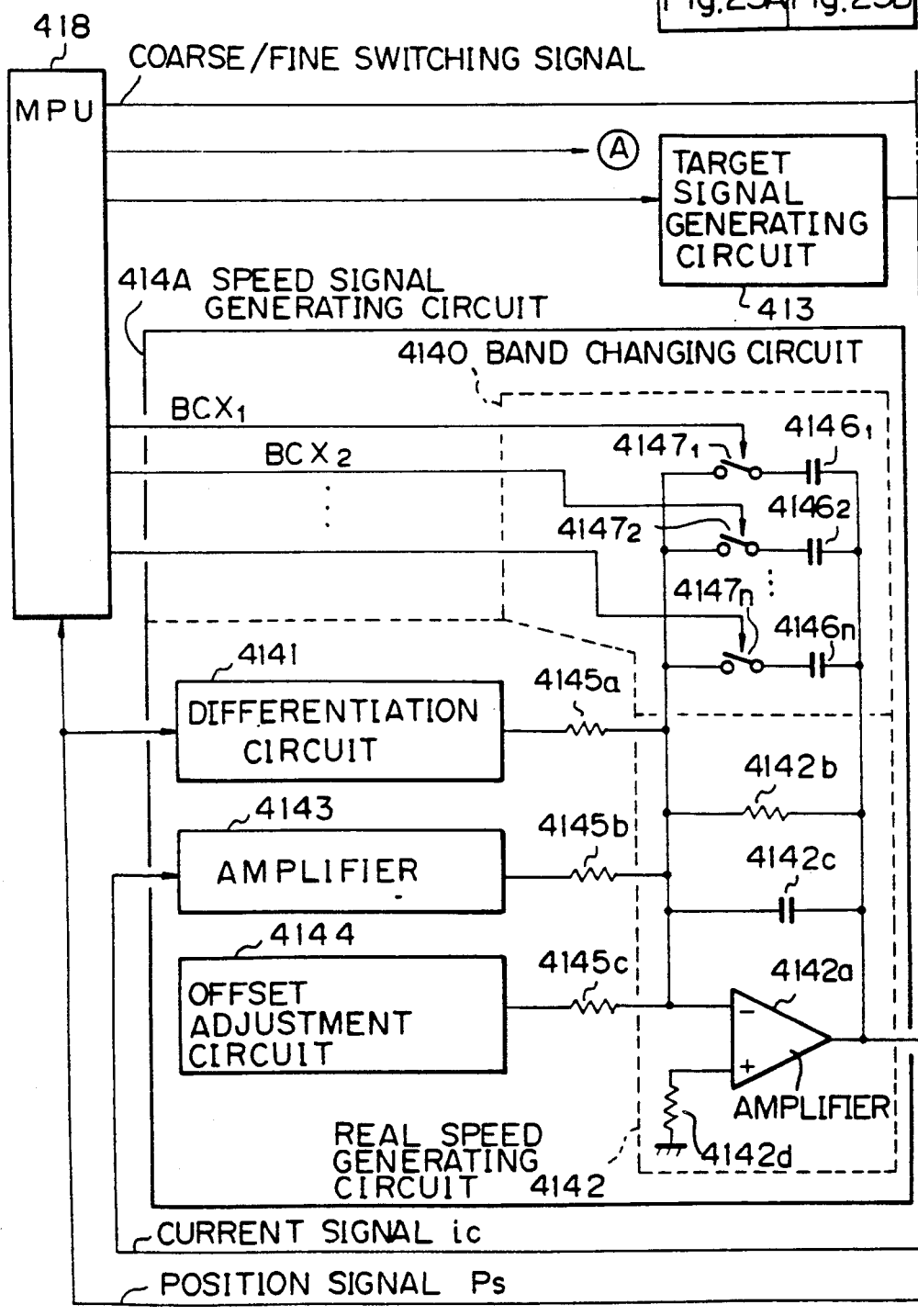
FIGS. 25A and 25B are detailed block diagrams of the fifth embodiment according to the present invention.

In this embodiment, the filter 151 is formed by a parallel circuit of a resistor R, a capacitor C12, and a switch SW and capacitor C2. This filter 151 can be modified to the band changing circuit 4140 shown in FIG. 25A.

Therefore, when the switch SW is turned ON, as shown in FIG. 9C, the cut-off frequency changes to f1, and when the switch SW is turned OFF, the cut-off frequency changes to f2.

By the same operation as in FIG. 10 and FIG. 11, in a "one difference" seek operation, during acceleration, the switch SW is turned OFF by the acceleration-in-progress signal SKA and the cut-off frequency becomes f2. This allows corruption of the acceleration signal to be reduced, while during deceleration, the switch SW is turned ON and the cut-off frequency becomes f1.

In this example, the band was restricted even during acceleration, so there was absolutely no worry of mechanical oscillation. However, the corruption of the acceleration current is greater than in the embodiment of FIG. 10 and the acceleration time is longer.

In the above embodiments of the present invention, explanation was made taking as an example a magnetic disk apparatus, but the invention may be applied to other apparatuses as well and it is possible to change the cut-off frequency with respect to the desired distance of movement.

Figure 14A:
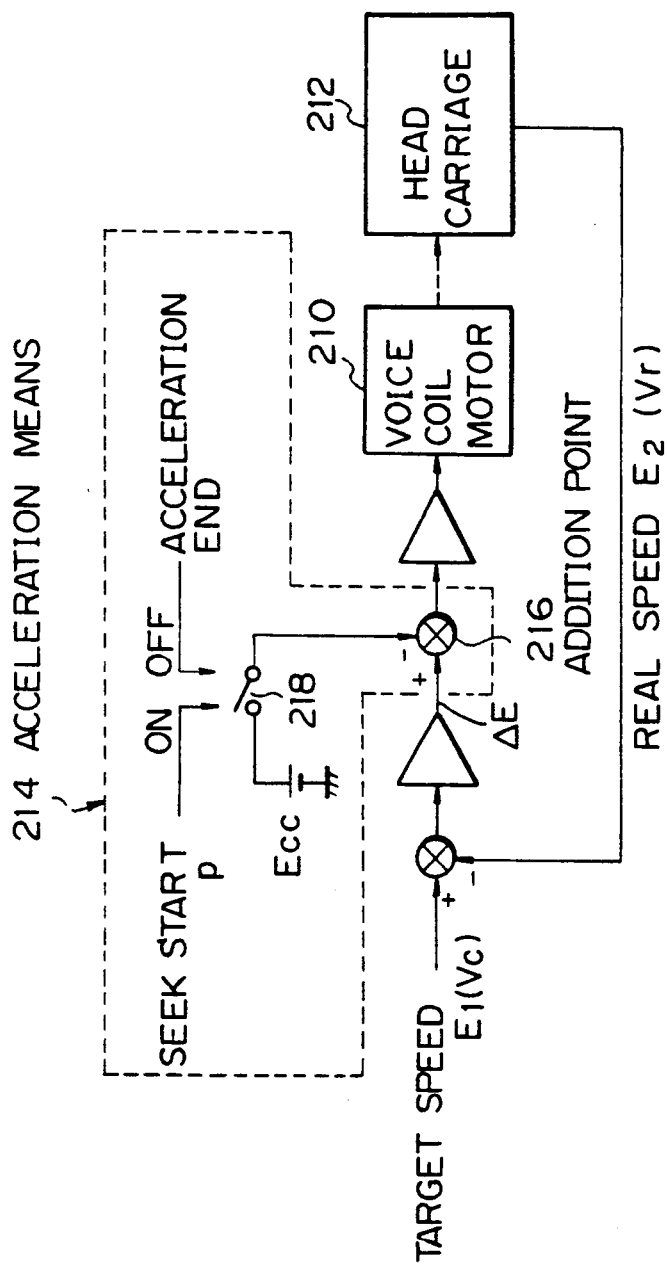
FIGS. 14A and 14B are block diagrams explaining the principle of a second embodiment according to the present invention.
Figure 14B:
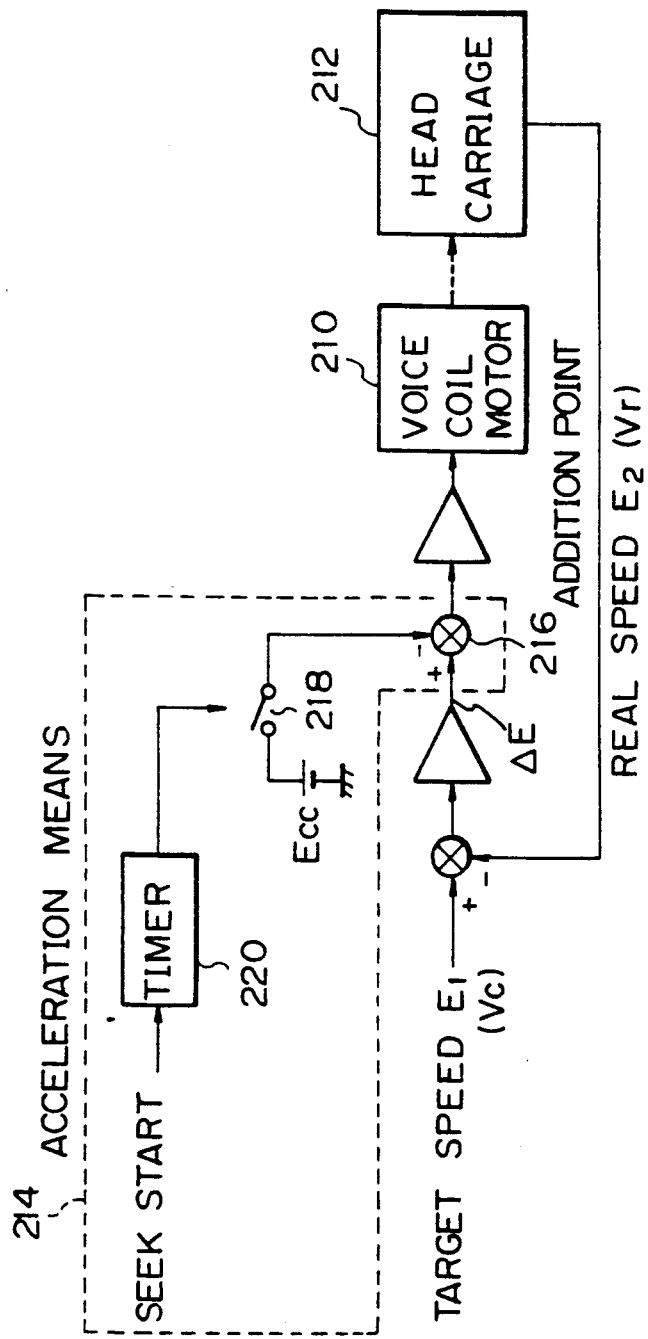

FIGS. 14a and 14B are block diagrams of the principle of the second embodiment according to the present invention.

According to the third embodiment of the present invention, there is provided a servo circuit for a magnetic disk apparatus provided with a servo loop which supplies a seek current based on an error signal ΔE between a target speed E1 and real speed E2 to a voice coil motor 210 and performs speed control on a head carriage 212 toward a target track position. An addition means 214 is provided in the servo loop for adding a predetermined addition value (voltage) Ecc to the error signal ΔE at the stage of acceleration after a start of the speed control.

Preferably, as shown in FIG. 14A, the acceleration means 214 has a switching means 218 for selectively supplying the predetermined acceleration value Ecc to an addition point 216 where the error signal ΔE of the servo loop is input and turns on the switching means 218 at the start of the seek operation and turns off the switching means 218 at detection of completion of the acceleration.

Preferably, as shown in FIG. 14B, the acceleration means 214 has a switching means 218 for selectively supplying the predetermined acceleration value Ecc to an addition point 216 where the error signal ΔE of the servo loop is input. Also included in the acceleration means 214 is a timer means 220 which turns on the switching means 218 at the start of the seek operation and turns off the switching means 218 after the elapse of a predetermined time from the start of the seek operation.

In the servo circuit for a magnetic disk apparatus according to the third embodiment of the present invention, even in a "one difference" seek operation where the target speed is extremely small, a predetermined acceleration value is added to the servo loop regardless of the error between the target speed and the real speed. Therefore, during the acceleration period, the seek current can rapidly rise to the saturation level and a sufficient acceleration current can flow. Thus, the access time for a "one difference" seek operation can be greatly reduced and demands for a higher speed magnetic disk apparatus can be met.

Figure 15:
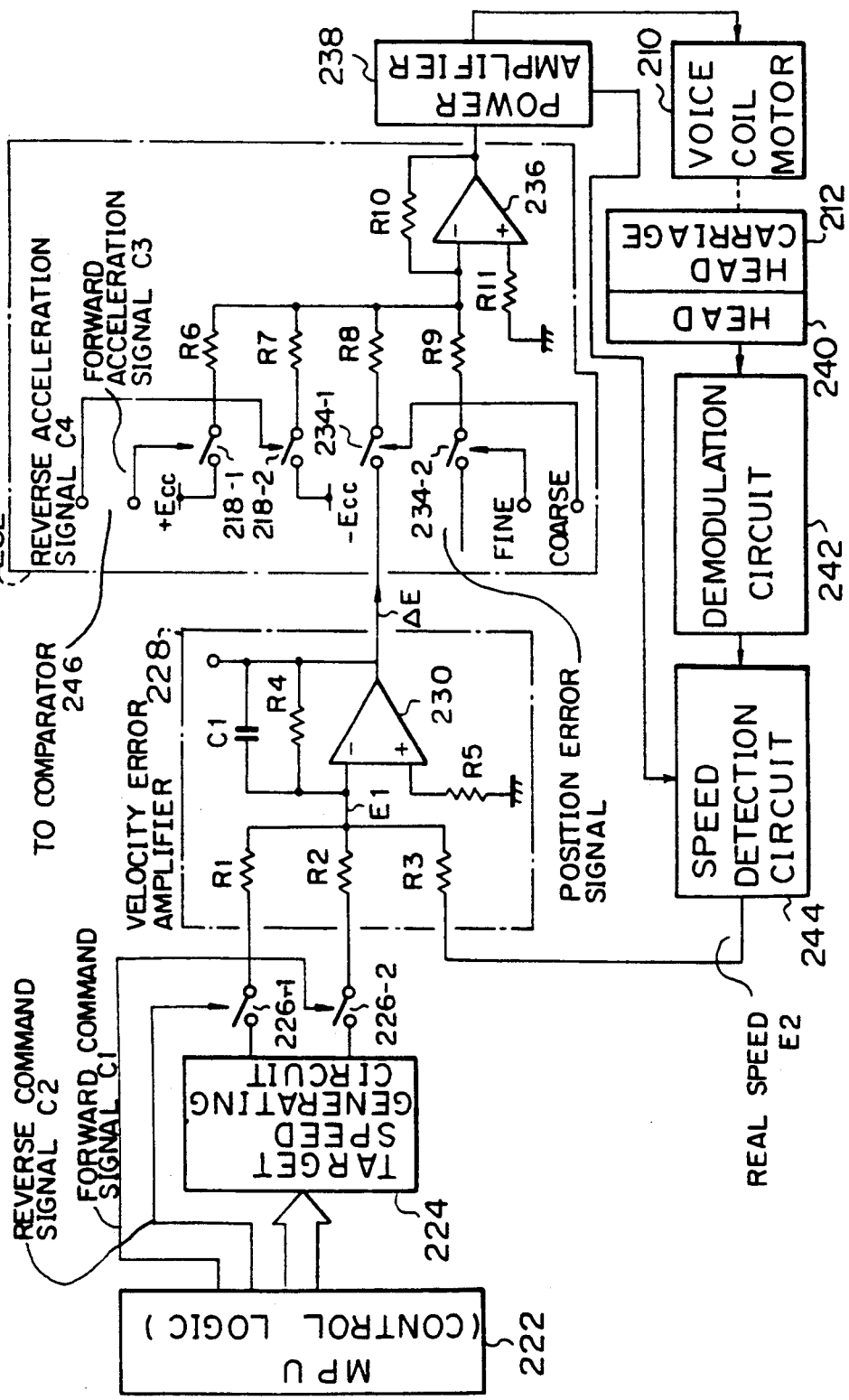
FIG. 15 is a detailed block diagram of the second embodiment according to the present invention.

FIG. 15 is a detailed circuit diagram of the second embodiment according to the present invention.

In FIG. 15, reference numeral 222 is an main processing unit forming a control logic. When an access signal is received from a host computer, target speed data for the seek operation is generated based on the current position of the head at that time and the target track position and a forward command c1 or reverse command signal c2 is output in accordance with the target track direction. Reference numeral 224 is a target speed generating circuit which converts target speed data corresponding to the forward or reverse command from the main processing unit 222 to an analog signal voltage by a digital to analog converter, generates a forward target speed signal through a switch 226-1 turned on by a forward command signal c1 at the time of forward control or outputs a reverse control target speed signal through a switch 226-2 turned on by a reverse command signal c2 during reverse control.

Reference numeral 228 is a velocity error amplifier which receives as an input from the target speed generating circuit 224 a forward or reverse target speed voltage E1 through a resistor R1 or R2, finds the error signal ΔE with the real speed E2 input through a resistor R3, and generates an error signal ΔE amplified by an amplifier 230 connecting a capacitor C1 and resistor R4 to a feedback circuit.

The output of the velocity error amplifier 228 is input to a speed control/position control switching circuit 232.

The speed control/position control switching circuit 232 is provided with a switch 234-1 which receives as an input the output of a velocity error amplifier 228 and a switch 234-2 which receives as an input position signal from a position signal generating circuit which is not shown. The switch 234-1 is turned on by a coarse signal (speed control signal) from the main processing unit 222, while the switch 234-2 is controlled by a fine signal (position control signal) from the main processing unit 222. That is, in the interval from the start of the seek operation to when the difference with respect to the target track becomes zero, the coarse signal is valid and the switch 234-1 is turned on, so speed control is performed. When the difference becomes zero, the fine signal becomes valid and the switch 234-2 is turned on, so position control maintaining the head on the target track is switched to.

The outputs of the switches 234-1 and 234-2 are connected in common through the resistors R8 and R9, are input to an amplifier 236 provided with a feedback resistor R10 and input resistor R11, and are supplied to a next stage power amplifier 238 through the amplifier 236. The output voltage from the amplifier 236 is converted to drive current by the power amplifier 238, and the drive current is passed to the voice coil motor 210. The voice coil motor 210 is connected mechanically to a head carriage 212 mounting a head 240 and controls the movement of the head 240 in the radial direction of a disk medium (not shown).

The servo signal from the disk medium obtained by the head 240 is input to the demodulation circuit 242. The real speed E2 is found by the speed detection circuit 244 from the position signal demodulated by the demodulation circuit 242 and the current signal flowing to the voice coil motor 210 detected by the power amplifier 238 and is fed back to the input stage of the amplifier 230 provided in the velocity error amplifier 228 through the resistor R3.

This part of the construction of the servo circuit is the same as in the prior art. In the fourth embodiment of the present invention, however, there is an addition and new provision, at the input stage of the amplifier 236 provided in the speed control/position control switching circuit 232, of an acceleration means for compulsorily adding a predetermined acceleration voltage at the acceleration stage of the start of the seek operation.

That is, the input of the amplifier 236 is provided with, as the addition means, a circuit for inputting a plus side power voltage +Ecc through the resistor R6 and the switch 218-1 and a circuit for inputting a minus side power voltage −Ecc through a resistor R7 and switch 218-2. The switch 218-1 for inputting the power voltage +Ecc is controlled to turn on or off by the forward acceleration signal C3, while the switch 218-2 for inputting the power voltage −Ecc is controlled to turn on or off by the reverse acceleration signal C4.

Figure 16:
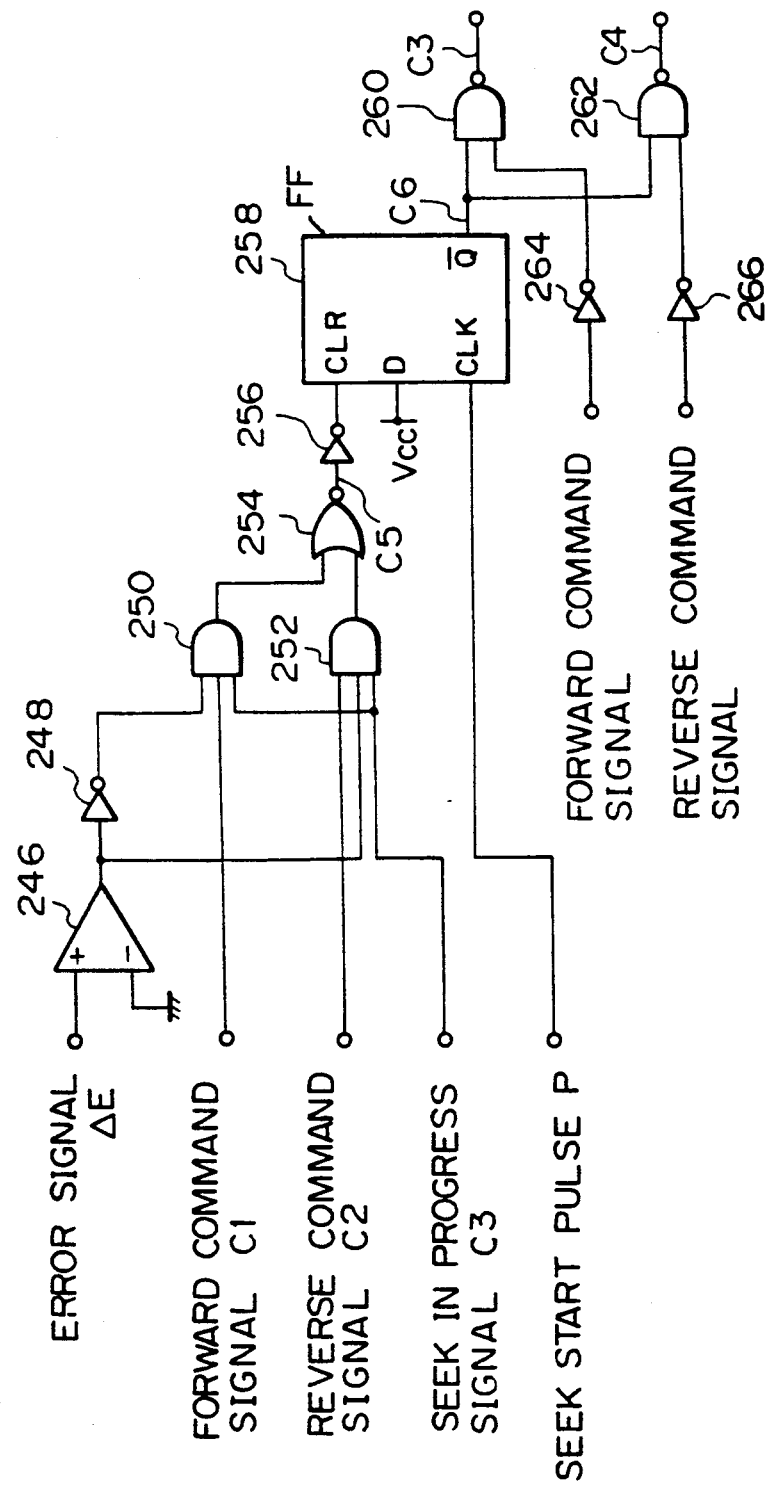
FIG. 16 is a circuit diagram of an acceleration control circuit in the second embodiment of the present invention.

FIG. 16 is a circuit diagram of the acceleration control circuit in the second embodiment of the present invention. The acceleration control circuit generates a forward acceleration signal C3 and a reverse acceleration signal C4 to the switches 218-1 and 218-2 provided in the speed control/position control switching circuit 232 shown in FIG. 15.

In FIG. 16, an error signal ΔE from the velocity error amplifier 228 is input to the acceleration control circuit. Also input from the main processing unit 222 are the forward command signal C1, reverse command signal C2, seek-in-progress signal C3 showing that the seek operation is in progress, and the seek start pulse P.

The error signal ΔE is input to the plus input terminal of the comparator 246. The minus input terminal of the comparator 246 is grounded. When the error signal ΔE becomes zero voltage, that is, after the start of the seek operation, the point of time when the real speed voltage E2 reaches the target speed voltage E1 and matches the same is detected as the point of the end of the acceleration and the high level output is inverted to the low level output.

The output of the comparator 246 is input to the AND gate 250 through the inverter 248 and is input directly to the AND gate 252.

The AND gate 250 receives as an input the forward command signal C1 and the seek-in-progress signal C3. Further, the AND gate 252 receives as an input the reverse command signal C2 and the seek-in-progress signal C3. The outputs of the AND gates 250 and 252 are input to the NOR gate 254 and are further input to the clear terminal CLR of the flip-flip 258 through the inverter 256. To the clock terminal CLK of the flip-flop 258 is applied the seek start pulse P. Further, the seek start pulse P is applied to the D terminal through the capacitor. The $\overline{Q}$ output of the flip-flop 258 is input to the NAND gates 260 and 262. The NAND gate 260 receives as input the forward command signal C1 through the inverter 264. Further, the NAND gate 262 receives as an input the reverse command signal C2 through the inverter 266. The output of the NAND gate 260 becomes the forward acceleration signal C3 for adding the acceleration voltage +Ecc to the error signal DE of the servo loop. The output of the NAND gate 262 becomes the reverse acceleration signal C4 for adding the predetermined acceleration value −Ecc to the error signal DE of the servo loop.

Next, the operation of the embodiment of FIGS. 15 and 16 will be explained referring to the operation timing chart of FIG. 17.

Figure 17:
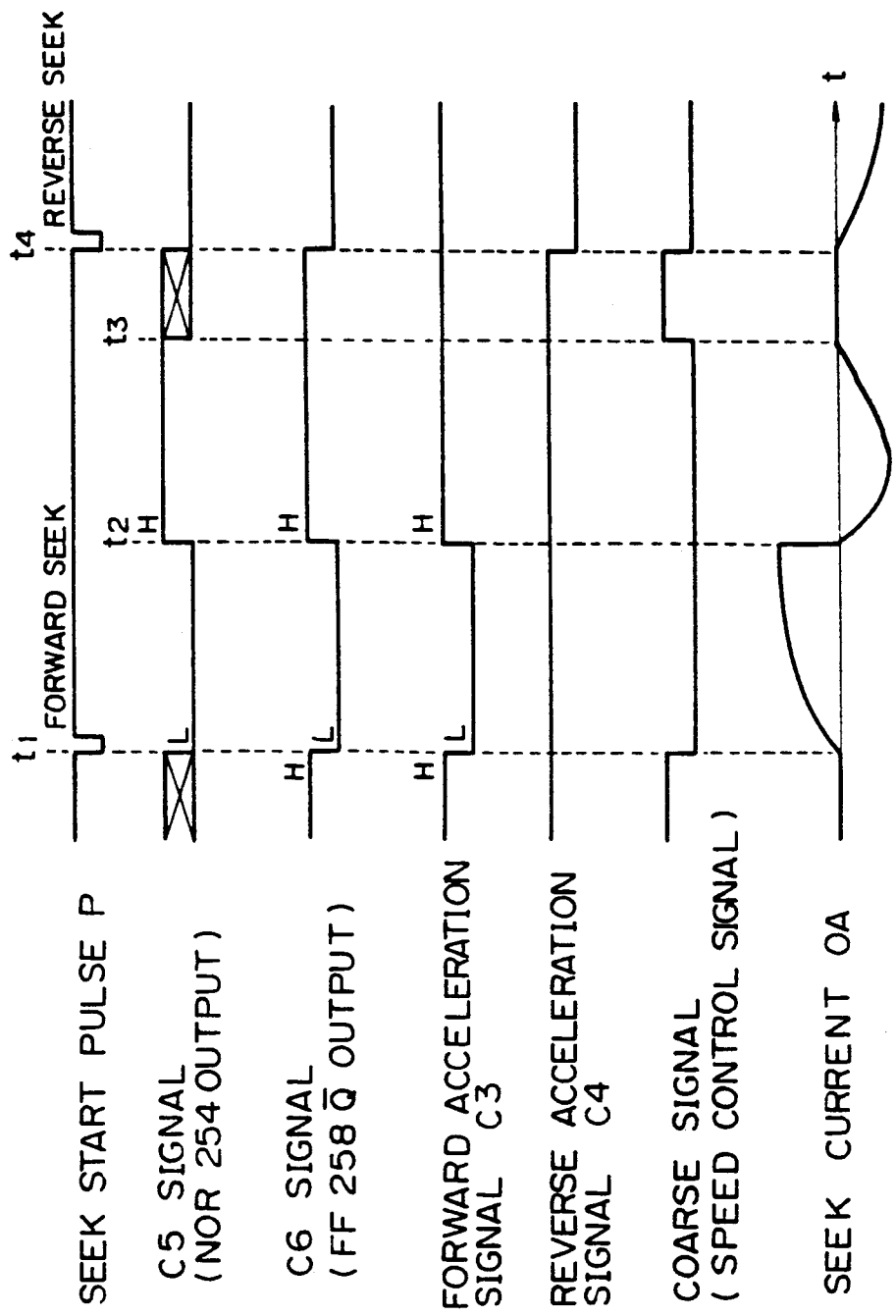
FIG. 17 is a timing chart of the operation of the second embodiment shown in FIGS. 15 and 16.

In FIG. 17, first, at the time t1 when a seek start pulse P is output for a "one difference" forward seek operation, along with the seek start pulse P, the main processing unit 222 makes the forward command signal C1 and the seek-in-progress signal C3 the high level. Therefore, the flip-flip 258 receiving the seek start pulse P is set and the C6 signal, serving as the $\overline{Q}$ output, falls from the high level to the low level. Further, at the start of the seek operation, the error signal ΔE is at its maximum level, the comparator 246 produces a high level output, and the AND gate 250 is inhibited by the inversion of the inverter 248. Even if both the forward command signal C1 and the seek-in-progress signal C3 become the high level, the C5 signal from the NOR gate 254 becomes the low level.

In this way, the flip-flop 258 is set by receiving the seek start pulse P. When the C6 signal, serving as the $\overline{Q}$ output, falls from the high level to the low level, a low level signal is input in the NAND gate 260 from the inverter 264 based on the high level forward command signal C1. The forward acceleration signal C3, which had been the high level up to then, falls to the low level.

Due to the operation of the acceleration control circuit shown in FIG. 16, the forward acceleration signal C3 for the switch 218-1 of the speed control/position control switching circuit 232 shown in FIG. 15 becomes the low level and the switch 218-1 closes. By this, the power voltage of +Ecc is supplied through the resistor R6 to the input of the amplifier 236.

On the other hand, at the same time as the start of the seek operation, target speed data corresponding to a "one difference" seek operation is input to the target speed generating circuit 224, and a target speed signal E1 with an extremely small signal voltage is input through the switch 226-2 turned on by the forward command signal C1 to the velocity error amplifier 228. Simultaneously, the real speed signal E2 at that time is input from the speed detection circuit 44, and an error signal ΔE between the target speed E1 and real speed E2 is input to the amplifier 236 through a switch 234-1 in an on state by a coarse signal.

Therefore, a power voltage +Ecc input under the control of the reverse acceleration signal C3 is added to the error signal ΔE at the input stage of the amplifier 236. A control voltage serving as the added value (ΔE+Ecc) is input by the amplifier 236 to the power amplifier 236, and, as a result, the power amplifier 238 passes a quickly rising acceleration seek current to the voice coil motor 210. Receiving this seek current, the head carriage 212 moves the head 240 to the target track.

Next, at the time t2, when the error signal ΔE for the comparator 246 shown in FIG. 16 reaches zero voltage, the output of the comparator 246 inverts to the low level and the end of the acceleration is detected. The low level output of the comparator 246 places the AND gate 250 in an enable state through the inverter 248, the C5 signal from the NOR gate 254 becomes the high level, the flip-flop 258 is reset, and, as a result, the C6 signal of the $\overline{Q}$ output is returned to the high level. Therefore, by the forward acceleration signal C3 from the AND gate 260 returning to the high level, the switch 218-1 provided in FIG. 15 is turned off and the acceleration control by the addition of the power voltage +Ecc is released.

Therefore, after the time t2, a deceleration current flows based on the error signal $\Delta$E produced by the error between the target speed signal E1 and the real speed signal E2. At the end of the seek operation at the time t3, the coarse signal returns to the high level, the speed control ends, and simultaneously the fine signal changes from the high level to the low level. When the switch 234-2 turns on, position control based on the position signal is switched to.

Further, at the time t4, if a seek start pulse P for the reverse seek operation is generated based on an access from a host computer, the reverse command signal C2 from the main processing unit 222 becomes the high level. In the same way as the forward seek operation, the reverse acceleration signal C4 from the NAND gate 262 provided in the acceleration control circuit of FIG. 16 becomes the low level, the switch 218-2 of FIG. 15 turns on. Therefore, the power voltage −Ecc is compulsorily applied to the servo loop, and the seek current of the "one difference" seek operation rises at the acceleration stage.

Figure 18:
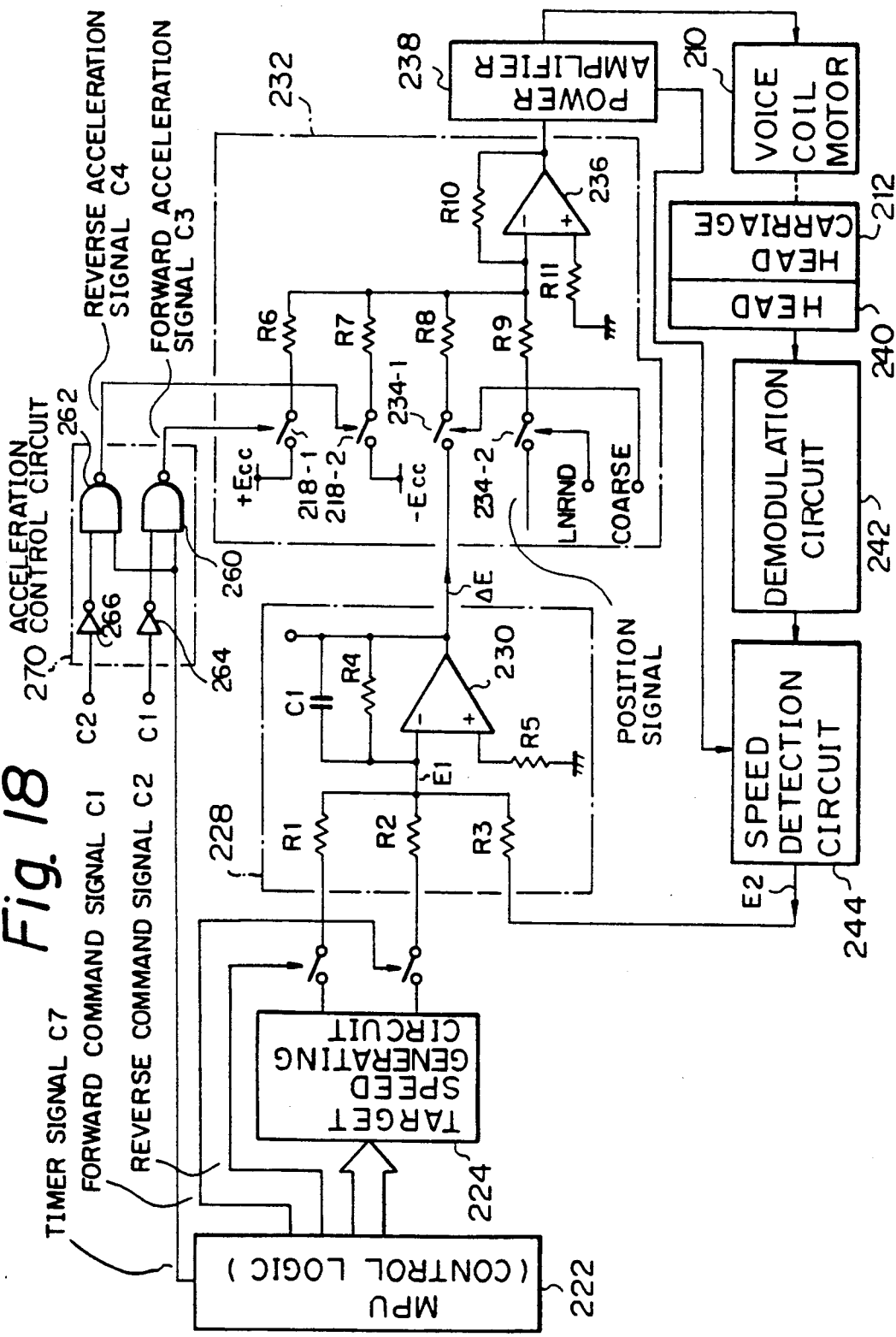
FIG. 18 is a third embodiment according to the present invention.

FIG. 18 is a block circuit diagram of a third embodiment according to the present invention.

In the third embodiment of FIG. 18, for a predetermined time from the start of the seek operation, a predetermined acceleration value +Ecc or −Ecc is added to the servo loop.

In FIG. 18, the construction of the servo circuit from the main processing unit 222 to the speed detection circuit 244 is the same as that of the embodiment of FIG. 15. Only the construction of the acceleration control circuit shown in FIG. 16 differs.

That is, in the embodiment of FIG. 18, the main processing unit 222 has a timer function in which a timer means (not shown) generates a timer signal C7 during a predetermined time from the start of the seek operation. A timer signal C7 from the main processing unit 222 is input to the NAND gates 260 and 262 provided in the acceleration control circuit 270. At other inputs of the NAND gates 260 and 262 are input a forward command signal C1 and a reverse command signal C2 through the inverters 264 and 266, respectively. A switch 218-1 provided in the speed control/position control switching circuit 232 is controlled by the forward acceleration signal C3 from the NAND gate 260. Further, the switch 218-2 is controlled by the reverse acceleration signal C4 from the NAND gate 262.

Next, an explanation will be made of the operation of the third embodiment of FIG. 18 referring to the operational timing chart of FIG. 19.

In FIG. 19, when the forward seek start pulse P is generated at the time t1, the main processing unit 222 activates the built in timer in accordance with the start of the seek operation and generates a low level timer signal C7 over the set time T. Therefore, receiving this timer signal C7, the forward acceleration signal C3 from the NAND gate 260 provided in the acceleration control circuit 270 becomes the low level, the switch 218-1 turns on, the power voltage +Ecc is compulsorily added to the error signal $\Delta$E of the servo loop and the seek current rises quickly in the acceleration period, maintaining a saturation level.

At the time t2 after the elapse of a set time T from the start of the seek operation, the timer signal C7 from the main processing unit 222 stops, that is, it returns to the high level. The forward acceleration signal C3 from the acceleration control circuit 270 also returns to the high level, the switch 218-1 turns off, and the addition of the power voltage +Ecc to the servo loop is stopped. After the time t2, deceleration control by the deceleration current produced by the error signal $\Delta$E between the target speed signal E1 and the real speed E2 is begun. At the time t3, position control is switched to.

Further, at the time t4, if a seek pulse for a reverse seek operation is obtained, the main processing unit 22 generates a low level timer signal C7 for a set time T in the same way as the forward seek operation. A low level reverse acceleration signal C4 is output from the acceleration control circuit 270, and the switch 218-2 is turned on. Therefore, the power voltage −Ecc is added to the error signal $\Delta$E of the servo loop, the seek current at the acceleration stage during the reverse seek operation is quickly raised and the saturation level maintained. After the elapse of the set time T, the addition of the power voltage −Ecc is stopped.

As explained above, according to the third embodiment of the present invention, by compulsorily adding a predetermined acceleration value to the error signal of the servo loop at the stage of acceleration at the start of the seek operation, even in a "one difference" seek operation where the target speed signal is extremely small, the seek current can be satisfactorily raised and a sufficient acceleration characteristic can be obtained. Also, higher speeds can be realized even for seek access operations for small differences such as a difference of one track.

Figure 20A:
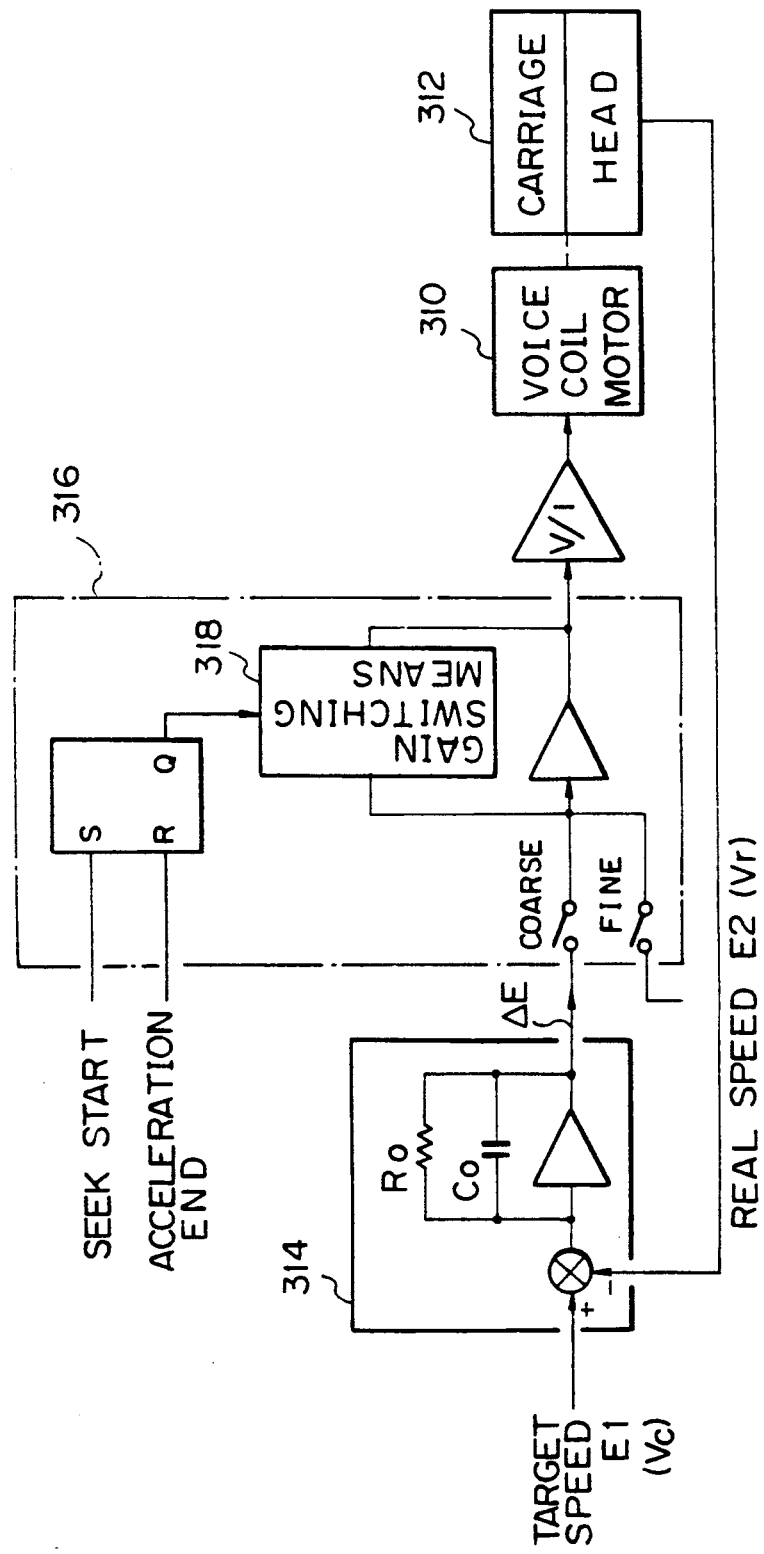
FIG. 20A is a block diagram of a fourth embodiment according to the present invention.

FIGS. 20A and 20B are a block diagram and a timing chart, respectively, for a fourth embodiment according to the present invention.

According to the fourth embodiment of the present invention, there is provided a servo circuit for a magnetic disk apparatus provided with a servo loop which supplies a seek current based on an error signal $\Delta$E between a target speed E1 (Vc) and a real speed E2 (Vr) to a voice coil motor 310. The servo circuit also performs speed control on a carriage head 312 toward a target track position. An amplifier circuit 316 is positioned at a latter stage of an amplifier circuit 314 for determining the frequency characteristics of the servo loop. The amplifier circuit has a gain switching means 318 which switches a preset gain G1 to a larger gain G2 between the start of a seek operation and the completion of acceleration as shown in FIG. 20B.

Preferably, the gain switching means 318 is provided in a speed control/speed control switching circuit 316 provided at a latter stage of a velocity error circuit 314 which determines the frequency characteristic of the servo loop.

In the servo circuit of a magnetic disk apparatus according to the fourth embodiment of the present invention, even when the acceleration/deceleration current cycle during a "one difference" seek operation becomes a value close to the cut-off frequency of the amplifier, during the acceleration period, the gain of the servo loop is amplified to a high gain after the circuit portions have determined the frequency characteristic of the servo loop. It is therefore possible to quickly raise the acceleration current and achieve sufficient acceleration without the limitations of the cut-off frequency of the servo loop. It is also possible to achieve faster access during "one difference" seek operation.

Figure 21A:
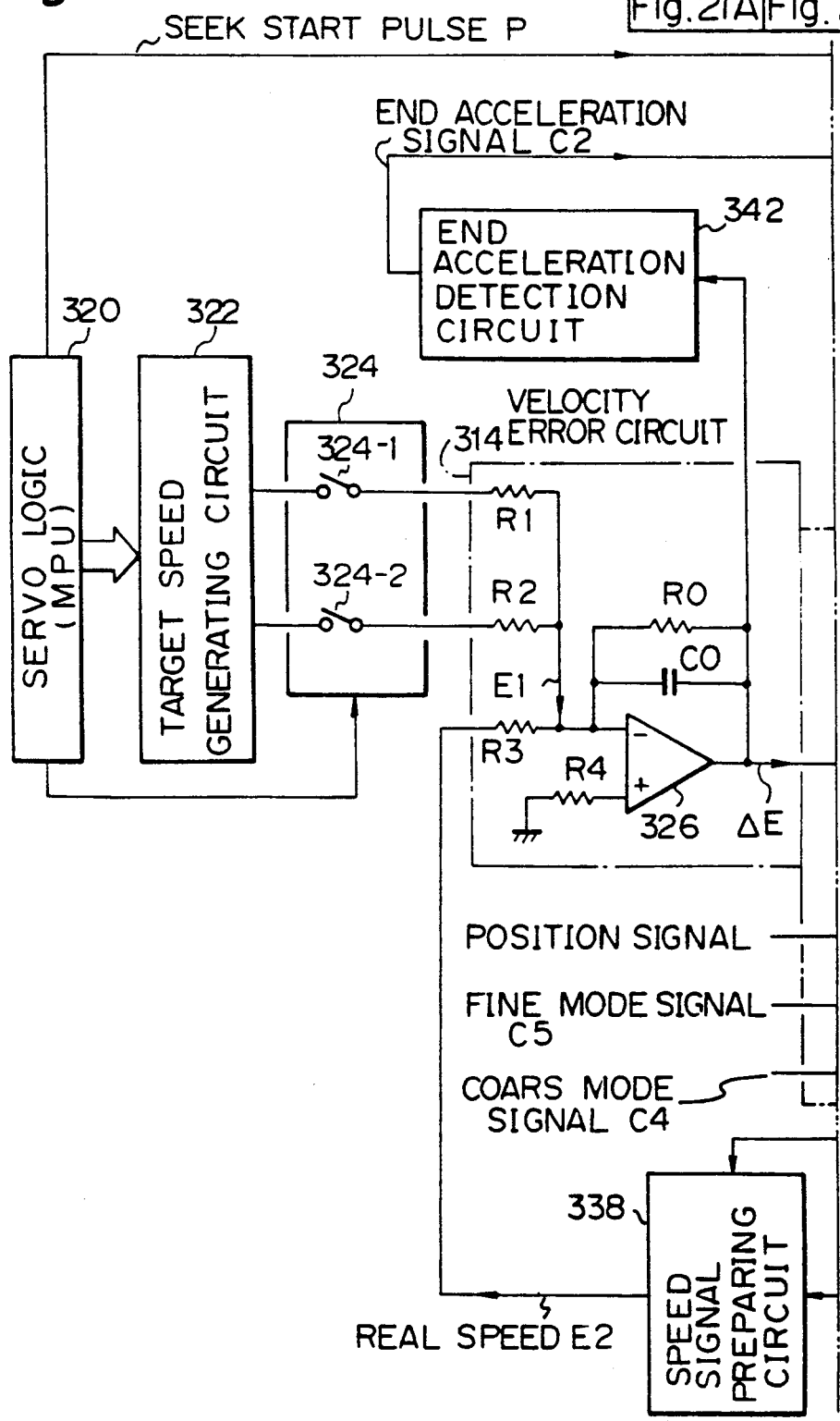
FIGS. 21A and 21B are detailed block diagrams of the fourth embodiment according to the present invention.
Figure 21B:
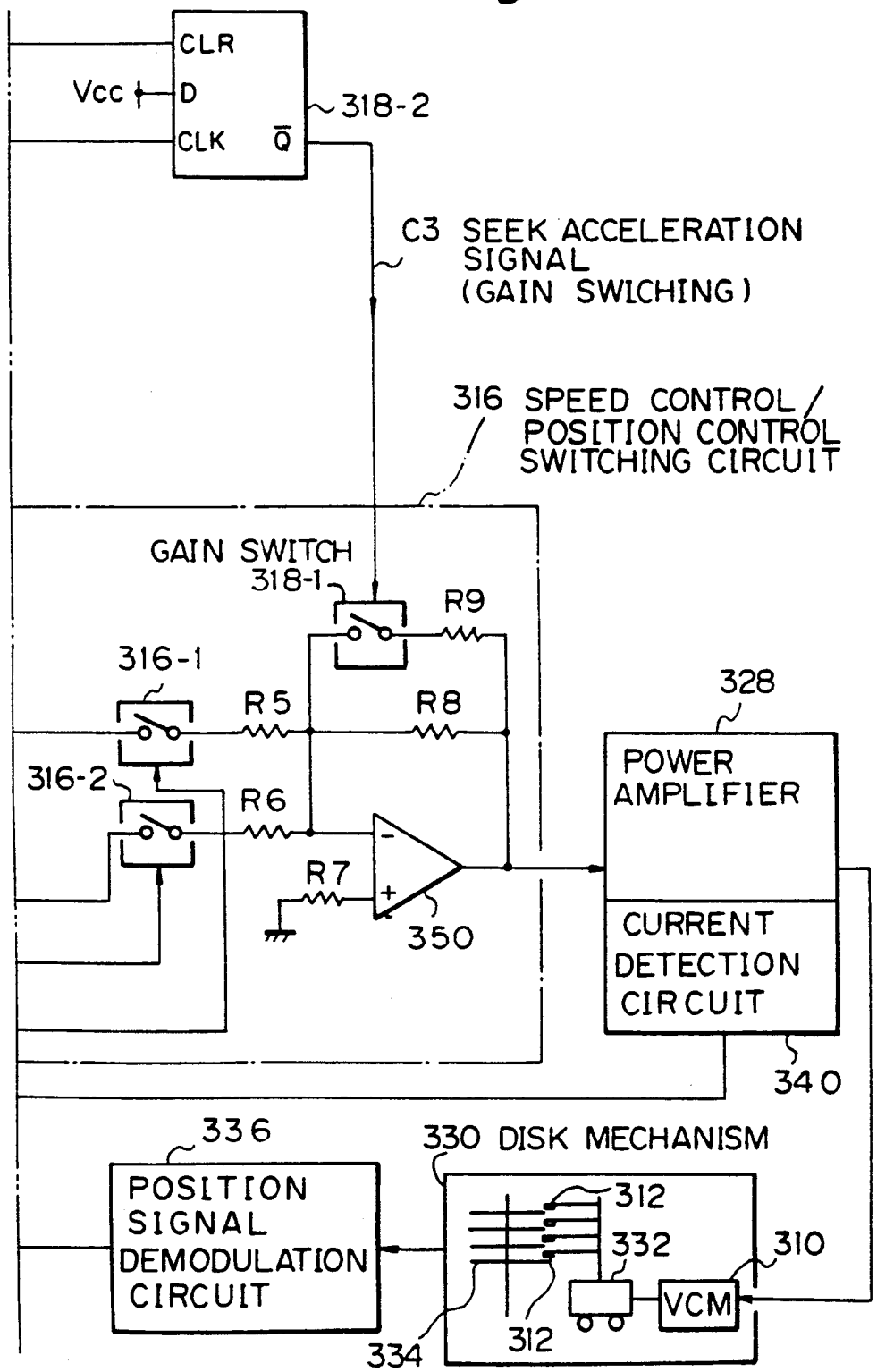

FIG. 21, including FIGS. 21A and 21B, is a detailed block circuit diagram of the fourth embodiment of the present invention In FIGS. 21A and 21B, the servo loop of the present invention is formed by a servo logic 320, a target speed generating circuit 322, a forward/reverse switching circuit 324, a velocity error circuit 314, a speed control/position control switching circuit 316, a power amplifier 328 provided with a current detection circuit 340, a voice coil motor 310, a head carriage 332, and disk mechanism 330 provided with a head 312 and a disk medium 334, a position signal demodulation circuit 336, a speed signal preparing circuit 338, and an end acceleration detection circuit 342.

The velocity error circuit 314 obtains the error between the reverse or forward target speed voltage E1 from the target speed generating circuit 322 input through the forward/reverse switching circuit 324 and the real speed voltage E2 given from the speed signal preparing circuit 338 and generates an error signal $\Delta E$. The velocity error circuit 314 is provided with an amplifier 326. The feedback circuit of the amplifier 326 includes a resistor R0 and a capacitor C0 connected in parallel, the time of R0 and C0 determining the frequency characteristic of the velocity error circuit 314, i.e., the frequency characteristic of the servo loop. The cut-off frequency f1 is set to a frequency lower than the mechanical cut-off frequency f2 in the disk mechanism 330, that is, the mechanical cut-off frequency f2 determined by the torsional resonance point of the servo arm.

The speed control/position control switching circuit 316 provided in the velocity error circuit 314 is provided with a switch 316-1 which is turned on by a coarse mode signal (speed control mode signal) C4 and a switch 316-2 which is turned on by the fine mode signal (position control mode signal) C5. It receives as an input the error signal $\Delta E$ output from the velocity error circuit 314 through the switch 316-1 and receives as input the position signal from a position signal generating circuit (not shown) through the switch 316-2. The output of the switch 316-1 is input to the amplifier 350 through the resistor R5 and the output of the switch 316-2 is input through the resistor R6. The amplifier 350 has a resistor R8 and resistor R9 connected in parallel in the feedback circuit. One of the resistors, R9, is connected in series to the gain switch 318-1. The gain switch 318-1 is usually on. Therefore, the gain G1 of the amplifier 350 in the steady state is determined by the value of the parallel resistors R8 and R9. On the other hand, when the gain switch 318-1 is turned off and the resistor R9 is cut off from the feedback circuit, the gain of the amplifier 350 becomes a high gain G2 determined by the resistor R8.

The gain switch 318-1 is controlled to turn on and off by the D-flip-flip 318-2 provided as the gain switching control means. The clock terminal CLK of the D-flip-flop 318-2 has applied to it the end acceleration signal C2 from the end acceleration detection circuit 342. The D terminal has input to it an end acceleration signal C2 through a capacitor. Further, the clear terminal CLR receives as an input the seek start pulse P2 from the servo logic 320.

Therefore, in the steady state, the D-flip-flop 318-2 is placed in a reset state, the seek acceleration signal C3, which becomes the $\overline{Q}$ output, is at a low level, and therefore the gain switch 318-1 turns on and the steady state gain G1 is set in the amplifier 350 by the value of the parallel resistors R8 and R9. When an access is received from the host computer and the servo logic 320 generates a seek start pulse P, the D-flip-flop 318-2 is cleared, the seek acceleration signal C3 serving as the $\overline{Q}$ output becomes the high level, and the gain switch 318-1 turns off. Therefore, the resistor R9 is cut off from the feedback circuit and the amplifier 350 is switched to the higher gain G2. The D-flip-flop 318-2 reset by the seek start pulse P is again set by the end acceleration signal C2 from the end acceleration detection circuit 342 obtained next. The acceleration signal C3 returns to the low level, the gain switch 318 turns on and the original gain G1 is returned to.

Next, an explanation will be made of the operation of the embodiment of FIG. 21 referring to the operational timing chart of FIG. 22.

Figure 22:
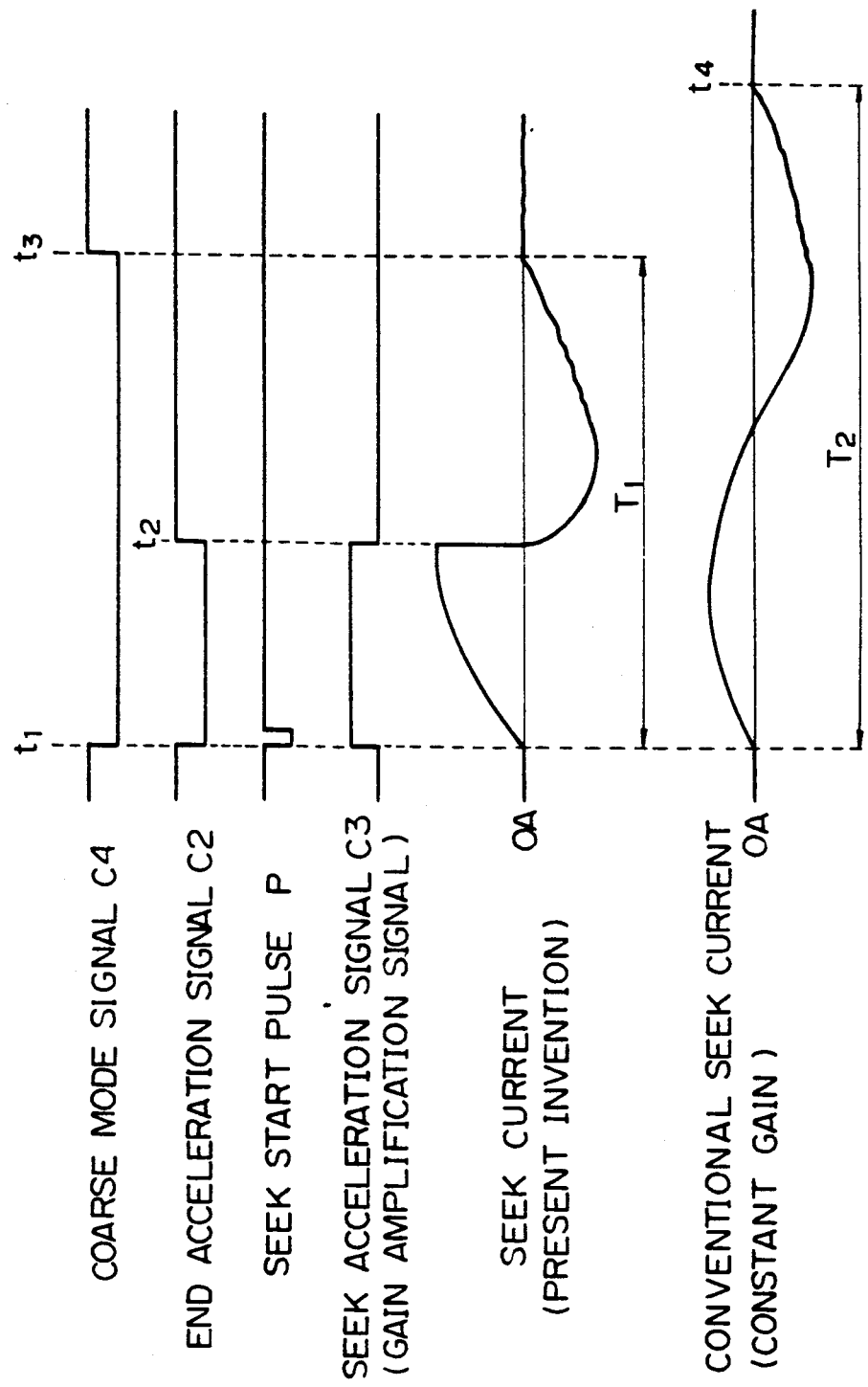
FIG. 22 is a timing chart of the operation of the fourth embodiment according to the present invention.

In FIG. 22, first, assume that at the time t1, the servo logic 320 receiving the access from the host computer starts the forward control. That is, the servo logic 320 supplies the target speed generating circuit 322 with the target speed data corresponding to the amount of difference from the target track at that time. The target speed generating circuit 322 generates a target speed voltage by analog to digital conversion, and the forward switch 324-1 of the forward/reverse switching circuit turns on by the forward control command from the servo logic 320. Thus, the target speed voltage E1 for the forward control is supplied to the velocity error circuit 314 through the switch 324-1.

In the initial state, the real speed voltage E2 from the speed signal preparing circuit 338 is zero, so the error signal DE output from the amplifier 326 provided in the velocity error circuit 314 is maximum. The maximum level error signal $\Delta E$ is input to the amplifier 350 of the speed control/position control switching circuit 316 through the switch 316-1 turned on by the coarse mode signal C4. At that time, since the D-flip-flop 318-2 receives the seek start pulse P from the servo logic 320 at the time t1 and is in the reset state, the gain switch 318-1 provided in the feedback circuit of the amplifier 350 receives the seek acceleration signal C3, where $\overline{Q}$ is the high level, and is switched off. The resistor R9 is cut off from the feedback circuit, so the switch is set to the higher gain G2 determined by the resistor R8.

Therefore, the error signal $\Delta E$ from the velocity error circuit 314 is amplified by the amplifier 350 by the higher gain G determined by the resistance R8. A seek current corresponding to the error signal $\Delta E$ is created by the power amplifier 328, and an acceleration current is passed to the voice coil motor 310 of the disk mechanism 330.

The voice coil motor 310, which receives the acceleration seek current from the power amplifier 328, starts the speed control for moving the head 312 by the carriage 332 to the target track position of the disk medium 334. Along with the speed control, the speed signal preparing circuit 338 prepares the real speed voltage E2 based on the position signal from the position signal demodulation circuit 336 and the current detection signal from the current detection circuit 340 provided in the power amplifier 328. Servo control is performed for feedback to the velocity error circuit 314.

When the real speed voltage E2 increases under this servo control and the target speed voltage E1 is reached the error signal DE from the amplifier 326 becomes zero voltage. Therefore, the fact that the zero voltage has been reached is detected by the end acceleration detection circuit 342. The end acceleration signal C2 rises to a high level with respect to the D-flip-flop 318-2 as shown at the time t2 in FIG. 22. The D-flip-flop 318-2, which had been in the reset state up until then, is returned once again to the set state at the time of detection of the end of the acceleration. Therefore, the seek acceleration signal C3, which serves as the $\overline{Q}$ output, returns to the low level from the high level, and the gain switch 318-1 turns on. Thus, the resistor R9 is connected to the feedback circuit and the original gain G1 is returned to.

That is, the amplifier 350 switches the normal gain G1 to the higher gain G2 in the period from the start of the seek operation to the end of the acceleration.

At the time t2, after the end of the acceleration, deceleration control is performed based on the error signal ΔE between the target speed voltage E1 and the real speed voltage E2. At the time t3, the difference from the target track becomes zero, the switch 316-2 turns on due to the fine mode signal C5 from the servo logic 320, and position control (fine control) is switched to for control so that the head traces the target track.

Compared with this "one difference" seek operation of the fourth embodiment of the present invention, the "one difference" seek operation of the related art suffered from the effects of the cut-off frequency f1 in the frequency characteristic determined by the time constants of the resistor R0 and the capacitor C0 provided in the velocity error circuit 314. As shown in FIG. 22, the constant gain seek current of the servo loop of the related art rose slowly during acceleration. If the seek operation is considered to begin at the time t1, a long seek time T2 extending until the time t4 is required compared with the seek time T1 of the fourth embodiment of the present invention.

As opposed to this, in the fourth embodiment of the present invention, even if the cycle of the acceleration/deceleration period of the seek current in a "one difference" seek operation approaches the cut-off frequency f1 of the servo loop, the gain of the amplifier 320, provided in the speed control/position control switching circuit 316 at the latter stage of the velocity error circuit 314 determining the frequency characteristic of the servo loop is switched to a higher gain during the acceleration. Therefore, the seek current during the acceleration period can be raised without being limited by the frequency characteristic of the servo loop and sufficient acceleration is made possible. Thus, it is possible to greatly reduce the access time in a "one difference" seek operation and realize high speed access.

Further, in the above embodiment, provision was made in the velocity error circuit 314 of circuit elements for determining the frequency characteristic of the servo loop. A gain switching means was provided in the speed control/position control switching circuit 316 serving as the latter stage of the velocity error circuit 314. The fourth embodiment of the present invention, however, is not limited to this and it is of course possible to provide, in a suitable portion of the amplifier circuit positioned at the latter stage of the amplifier circuit determining the frequency characteristic in the loop of the servo circuit, a gain switching means for switching to a gain higher than the usual gain in the period from the start of the seek operation to the end of the acceleration.

As explained above, according to the fourth embodiment the present invention, even in a "one difference" seek operation where the acceleration/deceleration period of the seek current is a value close to the cut-off frequency of the servo loop, it is possible to quickly raise the acceleration current and sufficiently accelerate without being limited by the cut-off frequency of the servo loop. It is also possible to achieve a much faster access in a "one difference" seek operation.

Figure 23:
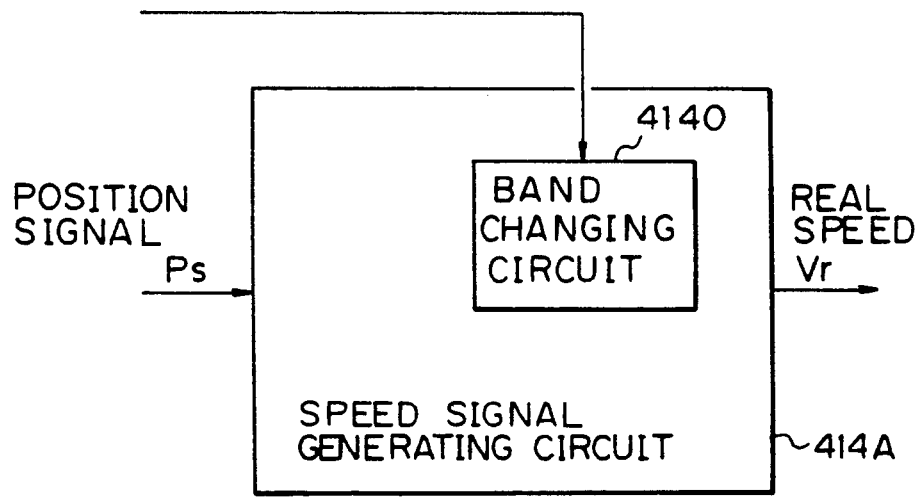
FIG. 23 is a block diagram of the basic construction of a fifth embodiment according to the present invention.

FIG. 23 is a block diagram of the basic construction of a fifth embodiment according to the present invention.

According to the fifth embodiment of the present invention, as shown in FIG. 23, there is provided a servo circuit for a magnetic disk apparatus which performs speed control over a servo object based on a speed error between a target speed and a real speed. Provision is made of a speed signal generating circuit 414A which generates the real speed Vr of the servo object based on a position signal Ps of the servo object 411 from a position signal demodulation circuit. The speed signal generating circuit is provided with a band changing circuit 4140 for changing the band of a speed signal producing circuit 414B in accordance with a seek difference.

Figure 24A:
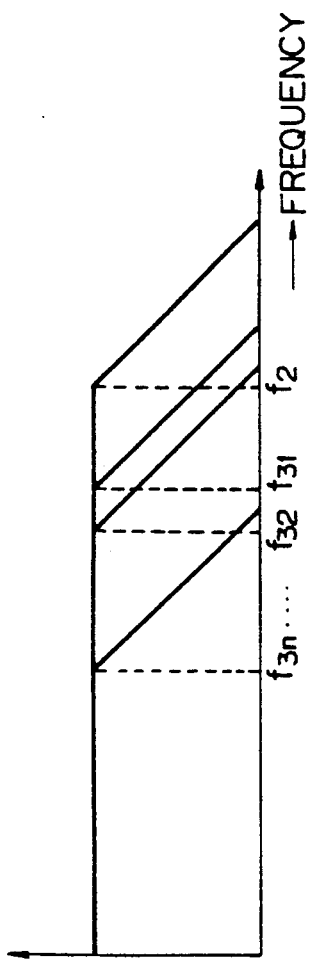
FIGS. 24A to 24D are graphs of the operational characteristics of the speed signal generating circuit of the fifth embodiment according to the present invention.
Figure 24B:
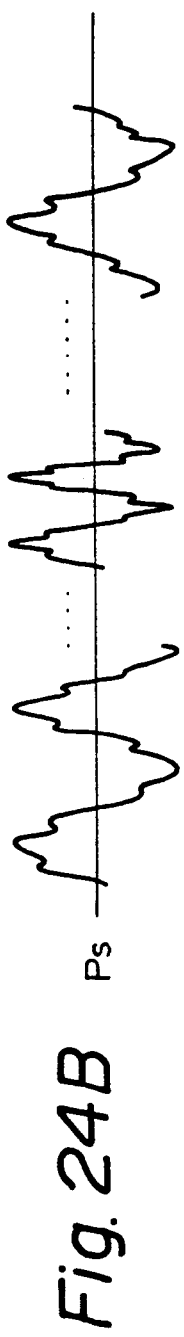

FIGS. 24A to 24B are graphs of the frequency characteristics and waveforms of the fifth embodiment. As shown in FIG. 24A, when the seek difference is small, a frequency f31 close to the resonance point f2 of the servo object is set. The larger the seek difference, the lower the frequency f32, . . . f3n than the resonance point f2 is set to.

Preferably, the speed signal generating circuit is provided with a differentiating circuit 4141 which differentiates the position signal to generate a speed, a real speed generating circuit 4142 which generates the real speed based on the differential signal, and a band changing circuit 4140 which changes the band of the real speed generating circuit 4142 according to the seek difference.

Figure 24C:
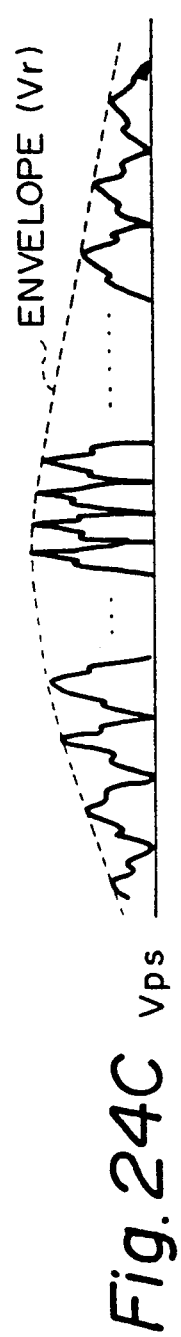
Figure 24D:

The operation of the fourth aspect of the present invention will now be explained referring to the graphs of FIGS. 24A to 24D. Although FIGS. 24B to 24D are the same waveforms as that of FIGS. 8D to 8F, these figures are used for explaining the fifth embodiment of the present invention.

Before the start of the seek operation, the speed signal generating circuit 414A is changed in band by the band changing circuit 4140 in accordance with the seek difference. As shown in FIG. 24A, the larger the seek difference, the smaller the band.

The speed signal generating circuit 414A generates a real speed Vr of the servo object based on the position signal Ps. The real speed Vr is prepared, for example, by differentiating the position signal Ps and producing a differential speed Vps, then integrating (smoothening) the differential signal Vps.

In the case of a small difference such as in a "one difference" seek operation, as explained in FIG. 5, the band of the speed error preparing circuit is set wide. The band of the speed signal generating circuit 4141 is also set correspondingly wide. Therefore, acceleration control time is shortened and a high speed seek operation is possible. In the case of a small difference, the oscillation frequency generated also becomes high, so even if the bands of the speed signal generating circuit 414A and speed error preparing circuit are made wide, it is possible to effectively suppress the oscillation component and to prevent the occurrence of loop resonance.

When the seek difference is large, the band of the speed signal generating circuit 414A is narrow. As shown in FIG. 24B, even if oscillation occurs in the position signal Ps due to the mechanical oscillation generated in the servo object, at the real speed Vr output the oscillation component is effectively suppressed and does not appear (FIG. 24D). Therefore, the occurrence of loop resonance is prevented and a stable seek operation is made possible.

If the band of the speed signal generating circuit 414A is made narrow, the time constant of the speed signal generating circuit 414A becomes large, so the time for speed control increases. Since the overall speed control time is long, the degree of that increase is small and the increase in the speed control time in the case of such a seek difference does not pose a problem in practice.

As mentioned above, the band of the speed signal preparing circuit is changed in accordance with the seek difference. Therefore, regardless of the magnitude of the seek difference, it is possible to effectively prevent the occurrence of loop resonance in seek control and it is possible to achieve stable, high speed seek operations even in the case of a small seek difference such as a difference of one track.

Figure 25B:
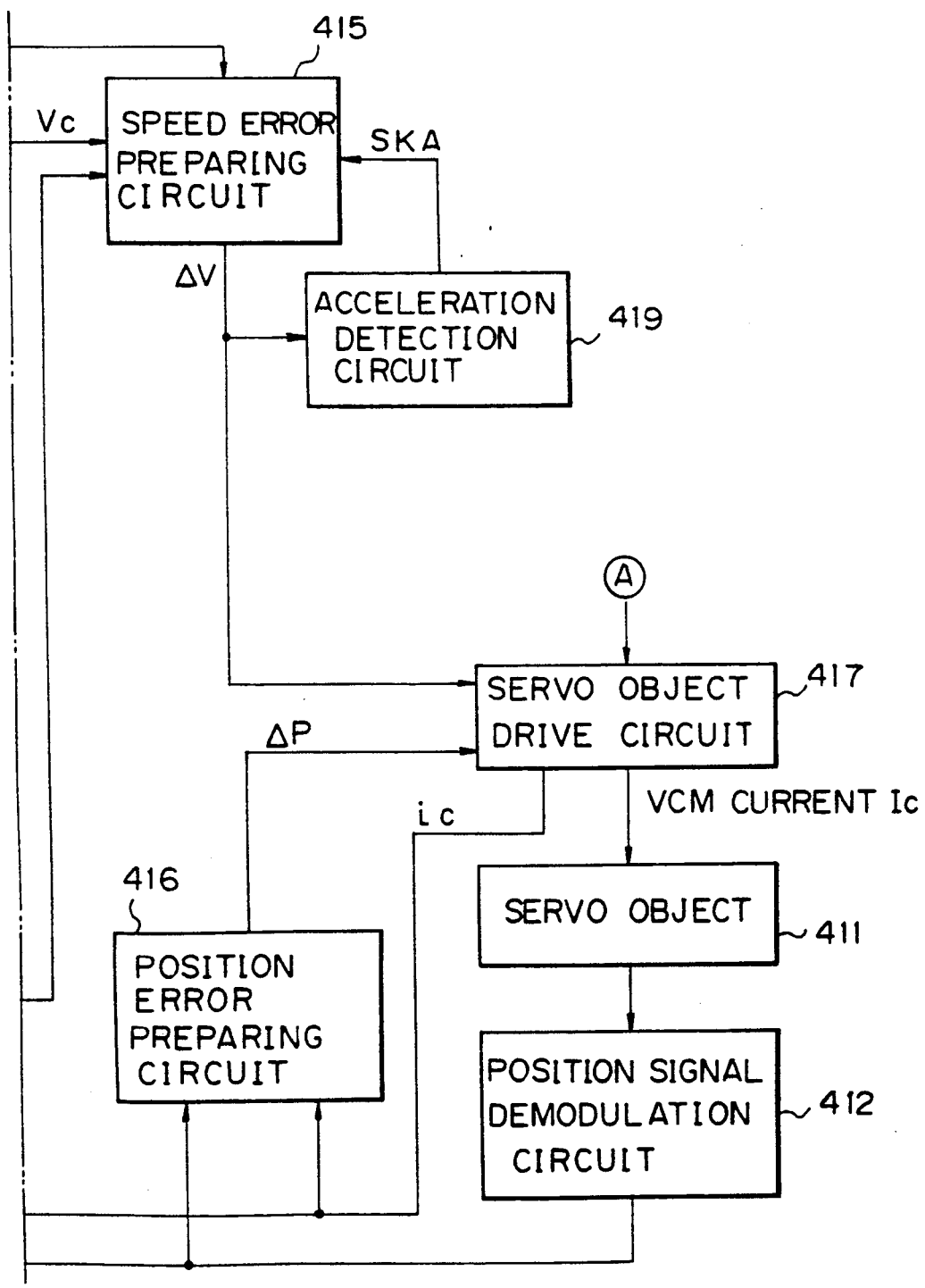

An embodiment of the fifth embodiment of the present invention will now be explained with reference to FIGS. 24A to 24D and FIG. 25. FIGS. 24A to 24D are waveform diagrams used for explaining the operation of the embodiment. FIG. 25 is a block diagram of the constitution of an embodiment of the speed signal generating circuit.

The speed signal generating circuit 414A and the band changing circuit 4140 are as explained in FIG. 23. Other portions corresponding to those in the related servo circuit are given the same reference numerals.

That is, reference numeral 411 is a servo object, and 412 is a position signal demodulation circuit for generating a position signal Ps.

Reference numeral 413 is a target speed generating circuit for generating a target speed Vc, and 415 is a speed error preparing circuit which generates a speed error signal $\Delta V$ from the speed error between the target speed Vc and the real speed Vr generated by the speed signal generating circuit 414A.

Reference numeral 416 is a position error preparing circuit which produces a position error $\Delta P$ based on the position signal Ps and the current signal ic.

Reference numeral 417 is a servo object drive circuit which amplifies the power of the speed error signal $\Delta V$ during speed (coarse) control and the position error signal $\Delta P$ during position (fine) control. The servo object drive also generates a voice coil motor current Ic for driving the servo object 411, supplies it to the servo object 411, detects the voice coil motor current Ic, and generates the current signal ic.

Reference numeral 418 is a main processing unit which supplies a band changing signal BCX1 to BCXn to the band changing circuit 4140 of the speed signal generating circuit 414A, sends the necessary control signals to the circuits, and controls the overall seek operation of the servo circuit.

Reference numeral 419 is an acceleration detecting circuit, which detects the speed error signal $\Delta V$ generated by the speed error preparing circuit 415. The acceleration detecting circuit 419 also generates an acceleration-in-progress signal SKA which changes the band of the speed error preparing circuit 415 in accordance with the amount of seek difference during acceleration and deceleration.

In the speed signal generating circuit 414A, 4142 is a real speed generating circuit. In this real speed generating circuit 4142, 4142a is a amplifier such as an operational amplifier, 4142b is an integration resistance, and 4142c is an integration capacitor. Reference numeral 4142d is an offset compensation resistor of the amplifier 4142a.

Reference numeral 4144 is an offset adjustment circuit which adjusts the offset of the real speed Vr. Reference numerals 4145a, 4145b, and 4145c are variable resistors for adjusting the gains of the differential circuit 4141, the amplifier 4143, and the offset adjustment circuit 4144.

Note that in the case of the fourth aspect of the present invention, the capacitance of the integration capacitor 4142c is a small capacitance required in the case of the minimum seek difference (difference of one track).

In the band changing circuit 4140, reference numerals $4146_1$ to $4146_n$ are capacitors for band adjustment. Reference numerals $4147_1$ to $4147_n$ are switches provided in series with the corresponding capacitors $4146_1$ to $4146_n$ and are turned on and off by the band changing signals BCX1 to BCXn from the main processing unit 418.

In the servo circuit of FIG. 25, the operations of the circuits other than the real speed preparing operation of the speed signal generating circuit 414A and the overall seek operation are the same as the operations of the circuits and the overall seek operation of the related servo circuit. The following explanation will concentrate on the operation of the speed signal generating circuit 414A.

Before the start of the seek operation, the main processing unit 418 turns on the band changing signal BCXi corresponding to the seek difference.

The band changing circuit 4140 of the speed signal generating circuit 414A, when receiving this band changing signal BCXi, turns on the corresponding switch 4147i. By this, the capacitor 4146i becomes parallel with the resistor 4142b along with the capacitor 4142c. Therefore, the band of the real speed generating circuit 4142, that is, the speed signal generating circuit 414A, is set to be narrower the larger the seek difference, as shown in FIG. 24A.

The offset adjustment circuit 4144 generates an offset compensation signal which performs adjustment so that the offset of the real speed Vr generated by the speed signal generating circuit 414A becomes zero. Further, the values of the variable resistors 4146a to 4146c are initialized corresponding to the output gains of the differential circuit 4141, the amplifier 4143, and the off-set adjustment circuit 4144 so that the correct real speed Vr is produced.

When the seek operation is started, the differential circuit 4141 differentiates the position signal Ps input from the position signal demodulation circuit 412 and generates the differential signal Vps (FIGS. 24B and 24C). Note that FIGS. 24B and 24C show the case where there is oscillation in the position signal Ps and the differential signal Vps.

On the other hand, the amplifier 4143 amplifies the current signal ic generated from the servo object 411.

The real speed generating circuit 4142 amplifies and integrates the differential signal Vps, current signal ic, and offset adjustment signal adjusted in level by the variable resistors 4145a to 4145c and prepares the real speed Vr. The real speed generating circuit 4142 is band restricted by the band changing circuit 4140. Therefore, even if there is oscillation in the differential speed Vps, this oscillation component is suppressed and does not appear in the output real speed Vr (FIGS. 24C and 24D).

Therefore, the oscillation is suppressed and does not appear either in the speed error signal ΔV generated by the speed error preparing circuit 415 based on the speed error between the real speed Vr and the target speed Vc from the target speed generating circuit 413 and the voice coil motor current Ic of the servo object drive circuit 417.

By this, even if mechanical oscillation occurs, even temporarily, in the servo object 411 at the time of the start of the seek operation, loop resonance can be prevented and a high speed seek operation can be stably performed.

Above, the explanation was made for a fifth embodiment of the present invention, but the fifth embodiment of the invention is not limited to this embodiment. For example, the band changing circuit 4140 may be made a filter and inserted at the output side or input side of the real speed generating circuit 4142. That band may be changed and controlled in accordance with the amount of seek difference.

Further, a plurality of capacitors can be combined in the band changing circuit 4140 of FIG. 25 so as to obtain the desired capacitance. By this, it is possible to produce a desired capacitance corresponding to various seek differences by a small number of capacitors.

Note that the speed signal generating circuit of the fifth embodiment of the present invention can of course be applied to servo circuits other than the related servo circuit.

As explained above, the fifth embodiment of the present invention changes the band of the speed signal generating circuit in accordance with the amount of seek difference. Thus, it is possible to effectively prevent the occurrence of loop resonance during the seek control regardless of the magnitude of the seek difference. Due to this, it is possible to achieve stable, high speed seek operations even with small seek differences such as a difference of one track.

A sixth embodiment according to the present invention will now be explained with respect to FIGS. 26 to 28. The sixth embodiment is a modification of the first embodiment of the present invention.

Figure 26:
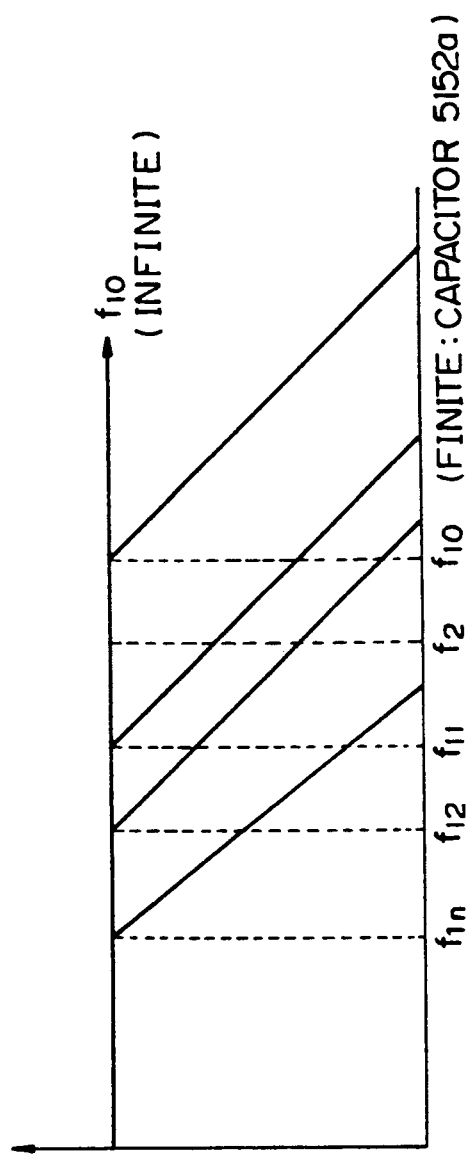
FIG. 26 is a graph for explaining the characteristic of the sixth embodiment according to the present invention.

FIG. 26 is a graph for explaining the characteristic of the sixth embodiment of the present invention. When the filter of the speed error preparing circuit 15 receives the acceleration-in-progress signal SKA from the acceleration detection circuit 19, the cut-off frequency $f_{10}$ of the filter is set to an infinite frequency or a higher frequency than the resonance point frequency $f_2$. In this case, the cut-off frequency $f_{10}$ is set as far as it can without vibration of the acceleration current occurring.

When the acceleration is completed, the main processing unit 18 changes from the acceleration control to the deceleration control, and the acceleration-in-progress signal SKA is stopped. The filter of the speed error preparing circuit 15 is set to a lower frequency than the resonance point frequency f2 when the speed error preparing circuit 15 starts to perform the deceleration control. In this case, the cut-off frequency becomes lower in accordance with the larger difference amount. Accordingly, in the deceleration control, the cut-off frequency of the filter of the speed error preparing circuit becomes lower as shown by $f_{11}, f_{12}, \ldots f_{1n}$ in accordance with the larger difference amount.

Figure 27:
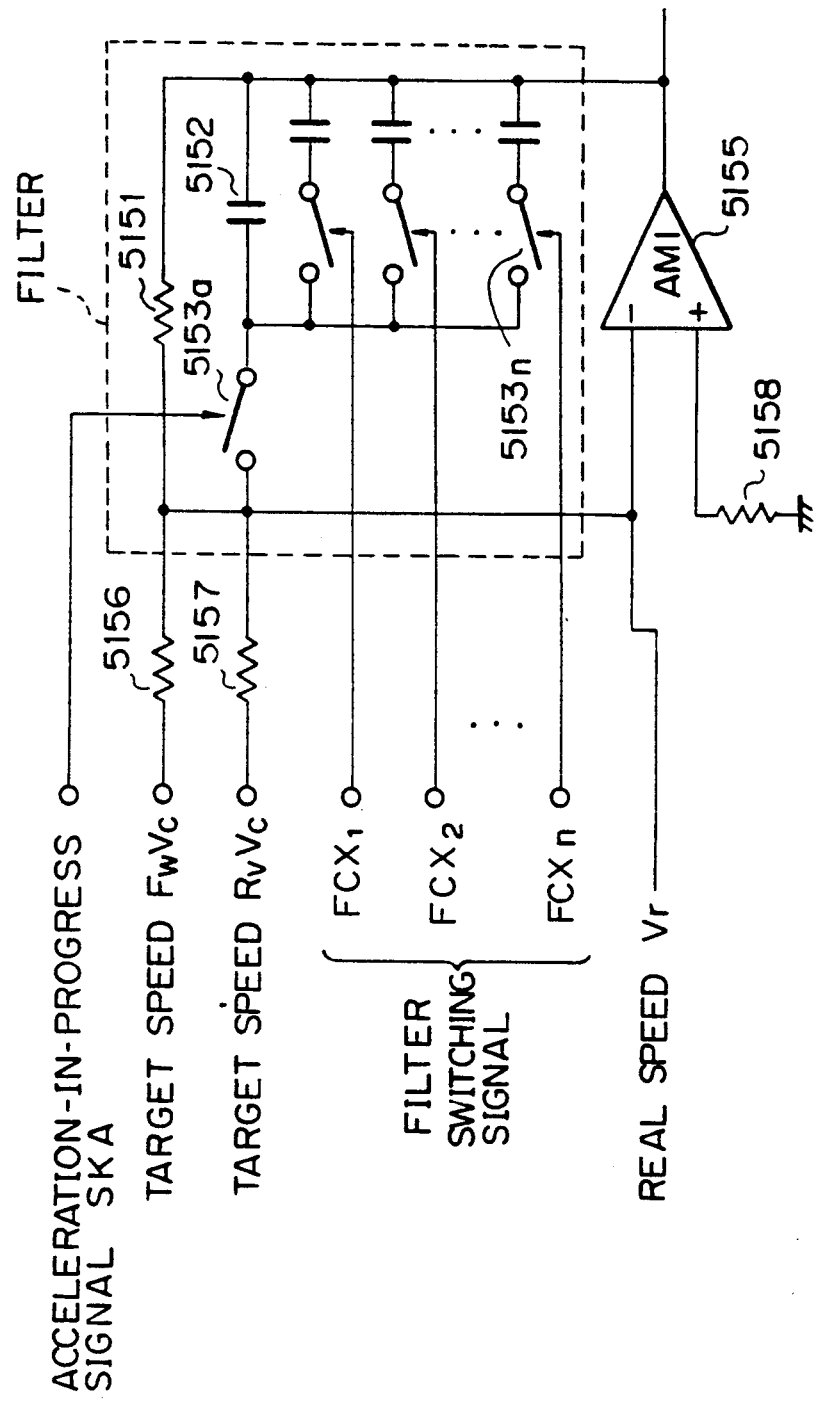
FIGS. 27 and 28 are filter circuits used in the sixth embodiment of the present invention.
Figure 28:
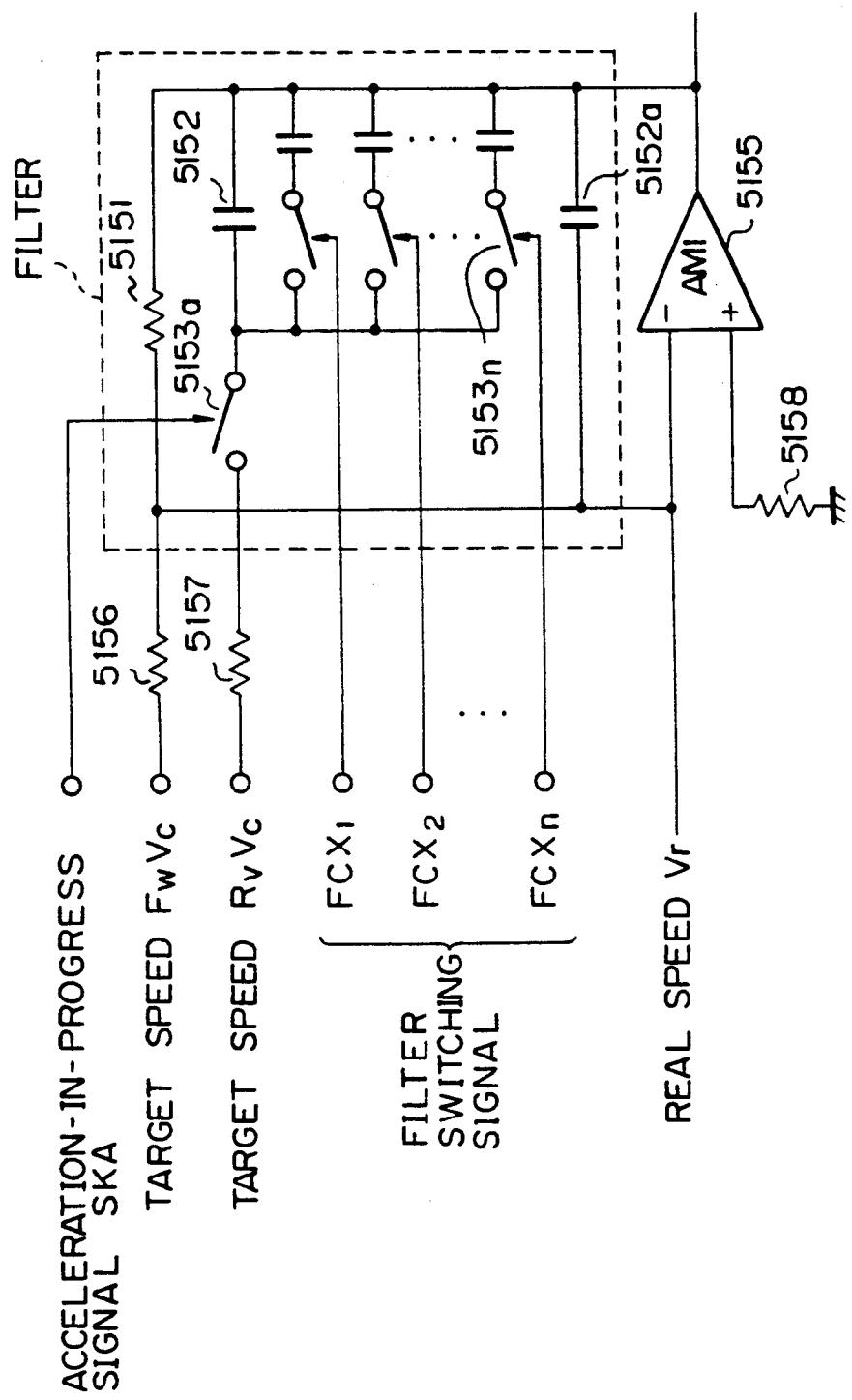

FIGS. 27 and 28 are filter circuits used in the sixth embodiment of the present invention. The filter shown in FIG. 28 is the same structure as the filter shown in FIG. 27 except that the capacitor 5152a has smaller capacitance and is added in parallel to the resistor 5151.

In FIG. 27, the resistors and capacitors are connected to each other as shown in the figure. The switch 5153 is switched by the acceleration-in-progress signal SKA from the acceleration detection circuit 19. The switches 5153a to 5153n are switched by the filter switching signals $FCS_1$ to $FCS_n$. The switching operation is the same as in the fifth embodiment of the present invention. The capacitor 5152a shown in FIG. 28 has a smaller value to the extent that vibration of the servo object does not occur.

Finally, while the present invention has been explained using various embodiments, various modifications are possible in accordance with the gist of the present invention. These are all included in the scope of the present invention.

We claim:

1. A servo circuit for a magnetic apparatus for performing speed control of an object to a target position in accordance with an amount of movement of the object under acceleration control and then deceleration control, comprising:

target speed generating means for generating a target speed signal in accordance with the amount of movement of the object;

speed signal generating means for generating a real speed from a position signal obtained from the object;

speed error preparing means for controlling the speed of the object based on an error between the target speed and the real speed; and acceleration detection means for detecting acceleration in progress based on an output from said speed error preparing means and outputting an acceleration signal, a cut-off frequency of said speed error preparing means being switched between an acceleration and a deceleration based on the acceleration signal output from said acceleration detection means through a switch, said speed error preparing means further comprising means for limiting a frequency band of the output indicating the error between the target speed and the real speed, and for cutting off the frequency band based on a predetermined frequency indicating the cut off frequency.

2. A servo circuit as claimed in claim 1, wherein said speed error preparing means comprises a CR filter, operatively connected to said acceleration detection means, including a resistor and capacitor connected in parallel, for changing a cut-off frequency, the change of the cut-off frequency being performed by connection or disconnection of said capacitor in said CR filter based on the acceleration signal.

3. A servo circuit as claimed in claim 2, wherein the cut-off frequency is set to a predetermined frequency by connecting said capacitor during deceleration, and wherein the cut-off frequency is set to a higher frequency than the predetermined frequency by disconnecting said capacitor during acceleration.

4. A servo circuit for a magnetic apparatus according to claim 1, further comprising a filter including a resistor and a capacitor.

5. A servo circuit for a magnetic apparatus according to claim 1, wherein the cut off frequency is switched by said switching means.

6. A servo circuit for a magnetic disk apparatus for supplying a seek current based on an error between a target speed and a real speed to a voice coil motor and performing speed control on an object toward a target track position, comprising:

target speed generating means for generating a target speed in accordance with an amount of movement of the object;

speed signal generating means for generating a real speed from a position signal obtained from the object;

speed error generating means for generating a speed error signal based on an error between the target speed and the real speed;

acceleration means provided between said speed error generating means and the voice coil motor for applying a saturation voltage to the speed error signal during acceleration at the start of the speed control and adding a predetermined control voltage corresponding to the error between the target and the real speed during deceleration; and speed control means for controlling the object based on the speed error signal and a gain.

7. A servo circuit as claimed in claim 6, wherein said acceleration means comprises:

switching means for selectively supplying the predetermined control voltage to an addition point where the error signal generated by said speed error generating means is input; and a voltage source for supplying a predetermined DC voltage, said switching means being turned ON at the start of the seek operation and turned OFF at detection of completion of the acceleration.

8. A servo circuit as claimed in claim 7, wherein said acceleration means further comprises:

timer means for turning ON said switching means at the start of the seek operation and turning OFF said switching means after the elapse of the predetermined time from the start of the seek operation.

9. A servo circuit as claimed in claim 6, wherein said acceleration mans comprises:

switching means for selectively supplying the predetermined control voltage to an addition point where the error signal generated by said speed error generating means is input;

timer means for turning ON said switching means at the start of the seek operation and turning OFF said switching means after the elapse of the predetermined time from the start of the seek operation; and a voltage source for supplying a predetermined DC voltage.

10. A servo circuit for a magnetic disk apparatus for supplying a seek current based on an error between a target speed and a real speed to a voice coil motor and performing speed control on an object toward a target track position, comprising:

target speed generating means for generating a target speed in accordance with an amount of movement of the object;

speed signal generating means for generating a real speed from a position signal obtained from the object;

speed error generating means for generating a speed error signal based on the error signal between the target speed and the real speed; and gain switching means provided between said speed error generating means and the voice coil motor for switching a preset gain to a larger gain exceeding a servo band between the start of a seek operation and completion of acceleration.

11. A servo circuit as claimed in claim 10, wherein said switching of the gain switching means is performed by a seek acceleration signal obtained from a seek start pulse and an end acceleration signal.

12. A servo circuit for a magnetic disk apparatus for supplying a seek current, based on an error signal between a target speed and a real speed, to a voice coil motor and performing speed control on an object toward a target track position, comprising:

target speed generating means for generating a target speed in accordance with an amount of movement of the object;

speed signal generating means for generating a real speed from a position signal based on the position of the object;

speed error generating means for generating a speed error signal based on the error between the target speed and the real speed; and acceleration detection means, provided between said speed error generating means and the object, for detecting acceleration based on an output of said speed error generating means, said speed signal generating means further comprises a speed changing circuit for changing the speed of the real speed signal in accordance with an amount of movement of the object.

13. A servo circuit as claimed in claim 12, wherein said speed signal generating means further comprises:

a differentiating circuit for differentiating the position signal to generate the speed signal; and a real speed generating circuit for generating the real speed based on the differential signal.

14. A servo circuit as claimed in claim 12, wherein said band changing circuit comprises a plurality of switches and capacitors, respective ones of said switches and capacitors being connected in series, and each pair of series connected switches and capacitors being connected in parallel.

15. A servo circuit as claimed in claim 14, further comprising a main processing unit, wherein each of said switches is switched by a band changing signal generated by said main processing unit.

16. A servo circuit for a magnetic apparatus for performing speed control of an object to a target position in accordance with an amount of movement of the object under acceleration control and then performing deceleration control, comprising:

target speed generating means for generating a target speed signal in accordance with the amount of movement of the object;

speed signal generating means for generating real speed from a position signal obtained from the object;

speed error preparing means for controlling the speed of the object based on an error between the target speed and the real speed;

acceleration detection means provided between the speed error preparing means and the object for detecting acceleration based on an output of said speed error preparing means and outputting an acceleration signal; and main processing means for setting an amount of the movement of the object and positioning the object to the target position by decelerating;

said speed error preparing means comprises a filter for changing a cut-off frequency between acceleration and deceleration, and for changing the cut-off frequency during deceleration in accordance with an amount of movement based on the acceleration signal output from said acceleration detection means.

17. A servo circuit as claimed in claim 16, wherein said filter adjusts the cut-off frequency so as to become a high frequency during the acceleration, and to lower the cut-off frequency during the deceleration when an amount of movement becomes large.

18. A servo circuit as claimed in claim 16, wherein said filter adjusts the cut-off frequency so as to become a finite frequency higher than a resonance point frequency of the object during acceleration, and to lower the frequency during deceleration when an amount of movement is large.

19. A servo circuit for a magnetic apparatus for performing a speed control of an object to a target position in accordance with an amount of movement of the object under acceleration control and then deceleration control, comprising:

target speed generating means for generating a target speed signal in accordance with the amount of movement of the object;

speed signal generating means for generating a real speed from a position signal obtained from the object;

speed error preparing means for controlling the speed of the object based on an error between the target speed and the real speed, and including means for limiting a frequency band of the error and for cutting off the frequency band based on a predetermined frequency indicating the cut off frequency; and acceleration detection means for detecting an acceleration in progress based on an access start signal or a seek start signal, the cut off frequency at said means for limiting a frequency band of the error being switched in accordance with the acceleration detected by said acceleration detection means.

* * * * *

UNITED STATES PATENT AND TRADEMARK OFFICE
CERTIFICATE OF CORRECTION

PATENT NO. : 5,204,932

DATED : APRIL 20, 1993

INVENTOR(S) : TOHRU SHINOHARA ET AL.

It is certified that error appears in the above-identified patent and that said Letters Patent is hereby corrected as shown below:

TITLE PAGE [56] References Cited, delete this section in its entirety, and in place thereof insert the following:

--References Cited

U.S. PATENT DOCUMENTS

| | | | |
|---|---|---|---|
| 3,883,894 | 5/1975 | Johnson | 360/78 |
| 4,096,425 | 6/1978 | Brown et al | 318/561 |
| 4,184,108 | 1/1980 | Sordello et al | 318/618 |
| 4,237,502 | 12/1980 | Erickson et al | 318/5614 |
| 4,288,731 | 9/1981 | Lee et al | 318/5614 |
| 4,578,723 | 3/1986 | Betts et al | 360/77 |
| 4,609,855 | 8/1986 | Andrews et al | 318/561 |
| 4,697,127 | 9/1987 | Stich et al | 318/561 |
| 4,710,865 | 12/1987 | Higomura | 318/5944 |
| 4,724,369 | 2/1988 | Hashimoto | 318/561 |
| 4,988,933 | 1/1991 | Ogawa | 318/561-- |

Signed and Sealed this

Thirtieth Day of May, 1995

Attest:

BRUCE LEHMAN

Attesting Officer    Commissioner of Patents and Trademarks